United States Patent [19]
Ilbery

[11] Patent Number: 6,124,844
[45] Date of Patent: *Sep. 26, 2000

[54] FORCE FIELD HALFTONING

[75] Inventor: Peter William Mitchell Ilbery, Sydney, Australia

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/779,009

[22] Filed: Jan. 2, 1997

[30] Foreign Application Priority Data

Jan. 5, 1996 [AU] Australia ................. PN7430

[51] Int. Cl.$^7$ .............. G09G 5/10; H04N 1/40; G06K 9/36
[52] U.S. Cl. .................. 345/147; 358/456; 382/252
[58] Field of Search .................. 345/147, 153, 345/199, 431, 89, 501, 428, 432, 148, 149, 136, 137, 138; 250/559.05, 559.06, 234; 358/457, 456, 459, 458, 455, 534, 535, 536; 382/270, 252

[56] References Cited

U.S. PATENT DOCUMENTS

| | | | |
|---|---|---|---|
| 4,339,774 | 7/1982 | Temple | 358/456 |
| 4,878,125 | 10/1989 | Katayama et al. | 358/456 |
| 4,891,710 | 1/1990 | Nakazato et al. | 358/464 |
| 5,214,294 | 5/1993 | Toyojuku | 250/234 |
| 5,216,753 | 6/1993 | Ng | 345/432 |
| 5,271,070 | 12/1993 | Truong et al. | 358/465 |
| 5,271,095 | 12/1993 | Yamada | 345/432 |
| 5,313,309 | 5/1994 | Tai et al. | 358/455 |
| 5,317,390 | 5/1994 | Bolza-Schunemann et al. | 356/394 |
| 5,323,247 | 6/1994 | Parker et al. | 358/456 |
| 5,337,160 | 8/1994 | Jones | 345/138 |
| 5,341,228 | 8/1994 | Parker et al. | 358/456 |
| 5,353,127 | 10/1994 | Shiau et al. | 358/458 |
| 5,384,859 | 1/1995 | Bolza-Schunemann et al. | 382/112 |
| 5,438,634 | 8/1995 | Kumagai | 358/457 |
| 5,483,634 | 1/1996 | Hasegawa | 345/147 |
| 5,499,111 | 3/1996 | Sato et al. | 358/455 |
| 5,521,989 | 5/1996 | Fan | 382/252 |
| 5,526,438 | 6/1996 | Barton | 358/457 |
| 5,553,165 | 9/1996 | Webb et al. | 382/252 |
| 5,604,605 | 2/1997 | Moolenaar | 358/456 |
| 5,739,808 | 4/1998 | Suga et al. | 345/147 |
| 5,757,976 | 5/1998 | Shu | 382/252 |
| 5,844,532 | 12/1998 | Silverbrook et al. | 345/147 |
| 5,917,614 | 6/1999 | Levien | 358/456 |

FOREIGN PATENT DOCUMENTS

| | | | |
|---|---|---|---|
| 0477730 | 4/1992 | European Pat. Off. | H04N 1/40 |
| 0527285 | 2/1993 | European Pat. Off. | B41F 33/00 |
| 0682438 | 11/1995 | European Pat. Off. | H04N 1/40 |
| 03211967 | 9/1991 | Japan | H04N 1/40 |
| 06152966 | 5/1994 | Japan | H04N 1/40 |

OTHER PUBLICATIONS

"an adaptive algorithm For Spatial Greyscale" R.W. Floyd et al., Society For Information Display 1975, Symposium Digest of Technical Papers, 1975, pp. 75–77.

"Digital Halftoning", Robert ULichney, MIT press, 1991.

Primary Examiner—Steven J. Saras
Assistant Examiner—Paul A Bell
Attorney, Agent, or Firm—Fitzpatrick, Cella, Harper & Scinto

[57] ABSTRACT

A method and apparatus are disclosed which permit halftoning of pixels in an image based upon the relative repulsive forces between a current pixel being halftoned and preferably all previous pixels that have been halftoned. Such arrangements give improved halftoned image quality, at least for some images, compared to that obtained from error diffusion or dithering.

52 Claims, 10 Drawing Sheets

$WBbl_{x,y}$ $WBtl_{x,y}$ $WBtr_{x,y}$ $WBbr_{x,y}$

6,124,844

FORCE FIELD HALFTONING

FIELD OF THE INVENTION

The present invention relates to the field of digital image processing, and more particularly, to a method and apparatus for digital halftoning continuous tone images.

BACKGROUND ART

Digital halftoning is a technique used in image processing to produce a halftone output image from a continuous tone input image. In order to halftone a digital colour image, a continuous tone colour image is sampled, for example with a scanner, and the samples are then digitised and stored in a computer device. In a full colour system, the digitised samples, or pixels, can consist of independent binary representation of the colour components of an image. For example, in the well known red, green and blue system (RGB), utilised in most output displays, the digitised samples or pixels consist of binary representations of the red, green and blue scanned colour values respectively. These binary representations typically range from 0 to 255 for each colour, thereby comprising 8 bits for each primary colour, or 24 bits to represent one pixel. Another colour system involves cyan, magenta, yellow and black (CMYK) and is used predominantly in printer output devices.

Standard cathode ray tube (CRT) type display devices are able to display each pixel with a large number of variations of each colour component of the pixel, giving rise to the desirability of storing 256 possible values for each colour component of each pixel of a CRT type display. Other output devices however, such as printers and certain display devices such as ferro-electric liquid crystal displays are often designed to only be able to display a limited number of colours or intensity values for each output colour. Hence, when displaying an image on such devices, it is necessary to create the sensation of multilevel colours by suitably distributing the possible output colours in the output image. By way of example, it can be assumed that each pixel of a first example display device is able to display red, green and blue colour values (RGB), with each colour value Making either one of a totally on or totally off state. Therefore, each colour component value can display one of two colours and the total number of colours which can be displayed by such a pixel will be 2×2×2=8 colours.

Two well known methods of halftoning are error diffusion and dithering. To describe error diffusion and dithering, consider by way of example, a monochrome display system where each pixel of an array of pixels can display either black or white. Assume the input image has 256 possible levels of display or values, 0 through 255. A decision must be taken for each pixel whether to display an "off" value of 0 or "on" value of 255.

In error diffusion for this example system, an "off" value is displayed at a current pixel when the input value at the pixel plus error values transferred to the pixel is less than or equal to 127; and an "on" value is displayed when the input value plus error values transferred to the pixel are greater than or equal to 128. An error value at the current pixel is derived, being the input value at the pixel plus the error values transferred to the pixel less the chosen output value. Portions of this error value are then transferred to surrounding pixels which have not, as yet, been output, in accordance with a known distribution mask. This has the effect of spreading, or "diffusing" the error over several pixels in die output image.

It has been found that error diffusion produces unsatisfactory results when an input image comprises video or other forms of data having motion (ie. dynamic images) or noise characteristics. When dynamic images or images having a certain associated noise therein are error diffused, the error diffusion process is subject to slight variations from one frame to the next which in turn results iii pixel values begin turned "on" and "off" at a detectable and distracting rate. This problem can be variously described as "sparkling noise", "dancing dots" and "twinkling", as the effect is to produce an area having rapidly changing individual pixel values but having a substantially constant overall colour. This problem applies equally to both monochrome and full colour display output devices in which such images are displayed.

The halftoning process of dithering traditionally involves the creation of "dither matrix", and the input value of a current pixel is compared with a corresponding value in the dither matrix and an output value for the current pixel is derived. For example, if the dither matrix value is less than the input value of the current pixel, the display device, such as a printer or display, produces an "on" value at the current pixel.

A dither matrix is preferably constructed having certain characteristics which improve the appearance of output halftoned images. These characteristics include arrangement of dither matrix values so that resulting "on" or "off" pixel values are as spread out as possible.

The process of dithering dynamic images, that is, dithering images forming part of an image sequence, however results in the reproduction of images have a noisy "mottled" appearance in regions having a substantially constant colour. Another disadvantage of dithering includes poor edge sharpness at the edges of graphical objects forming part of the image.

While each of the aforementioned halftoning techniques have their own distinct advantages, it is desirable to adopt favourable aspects of each technique.

It is an object of the present invention to provide an alternative form of halftoning which leads to improved output values, at least for various classes of images or image sequences.

SUMMARY OF THE INVENTION

In accordance with a first aspect of the present invention, there is provided a method of halftoning an image, said image comprising a plurality of pixels each having an input value and an assignable output value that can take on one of at least two output values, said method comprising, for a current pixel of said image, the steps of:

(a) determining an under result and an over result for a plurality of previously halftoned pixels of said image;

(b) determining using the under result and the over result of previously halftoned pixels an under result repulsive measure and an over result repulsive measure for the current pixel;

(c) comparing the under result repulsive measure to the over result repulsive measure; and (d) assigning a first output state value as the output value for the current pixel in the event that the under result repulsive measure is greater than the over result repulsive measure, and assigning a second output state value as the output value for said current pixel in the event that the over result repulsive measure is greater than the under result repulsive measure.

In accordance with another aspect of the present invention, there is provided a method of one or more images, each image comprising pixels, said method comprising, for each pixel of a current image, the steps of:

(a) assigning a predetermined value to an output value of the pixel, (b) determining using the predetermined output value of the pixel a repulsive measure between the pixel and a plurality of previously halftoned pixels of the current image;

(c) comparing the repulsive measure to the minimum repulsive measure achievable for the pixel in combination with a threshold value; and (d) retaining the predetermined value as the output value of said pixel if the repulsive measure is less than the sum of the minimum repulsive measure and the threshold value.

Apparatus for performing each of the above aspects is also disclosed.

In accordance with a another aspect of the present invention, there is provided a computer software system for executing instructions on a general purpose computer, wherein said instructions comprise a plurality of process modules for halftoning an image, said image comprising a plurality of pixels each having an input value and an assignable output value that can take on one of at least two output values, said modules comprising:

a first determining module for determining an under result and an over result for a plurality of previously halftoned pixels of said image;

a second determining module for determining using die under result and the over result an under result repulsive measure and an over result repulsive measure for die current pixel, a comparing module for comparing the under result repulsive measure to the over result repulsive measure; and an assigning module for assigning a first output state value as the output value for the current pixel in the event that the under result repulsive measure is greater than the over result repulsive measure, and assigning a second output state value as the output value for said current pixel in the event that the over result repulsive measure is greater than the under result repulsive measure.

In accordance with a another aspect of the present invention, there is provided a computer software system for executing instructions on a general purpose computer, wherein said instructions comprise a plurality of process modules for halftoning one or more images, each image comprising a plurality of pixels, said modules comprising:

an assigning module for assigning a predetermined value to an output value of the pixel, a determining module for determining a repulsive measure between the pixel and a plurality of previously halftoned pixels of the current image;

a comparing module for comparing the repulsive measure to the minimum repulsive measure achievable for the pixel in combination with a threshold value; and a decision module for retaining the predetermined value as the output value of said pixel if the repulsive measure is less than the sum of the minimum repulsive measure and threshold value.

In accordance with a another aspect of the present invention, there is provided a computer system comprising:

input means for receiving an image or a sequence of images;

halftoning means for halftoning said image(s), said halftoning being characterised by a determination of the relative repulsive forces between a current pixel of the image(s) being halftoned, and a plurality of previous pixels of the image(s) that have been halftoned; and a discrete level display for displaying the image(s) output from said halftoning means.

In accordance with a another aspect of the present invention, there is provided an image processor comprising:

input means for receiving pixel data of an image to be displayed;

means for determining repulsive measure data from repulsive forces between said pixel data and a plurality of previously halftoned pixels; and pixel calculator means for determining halftone output data of said image processor from said pixel data and said repulsive measure data.

In accordance with a another aspect of the present invention, there is provided a method of halftoning an image, said image comprising a plurality of pixels, said method being characterised by the determination of repulsive forces between a current pixel of the image being halftoned, and a plurality of previous pixels of the image that have been halftoned.

The present inventor has named this alternative type of halftoning, Force Field Halftoning, as it relies upon relative colour forces acting on a pixel.

BRIEF DESCRIPTION OF THE DRAWINGS

A number of preferred embodiments of the present invention will now be described with reference to the accompanying drawings in which.

Figure 17:
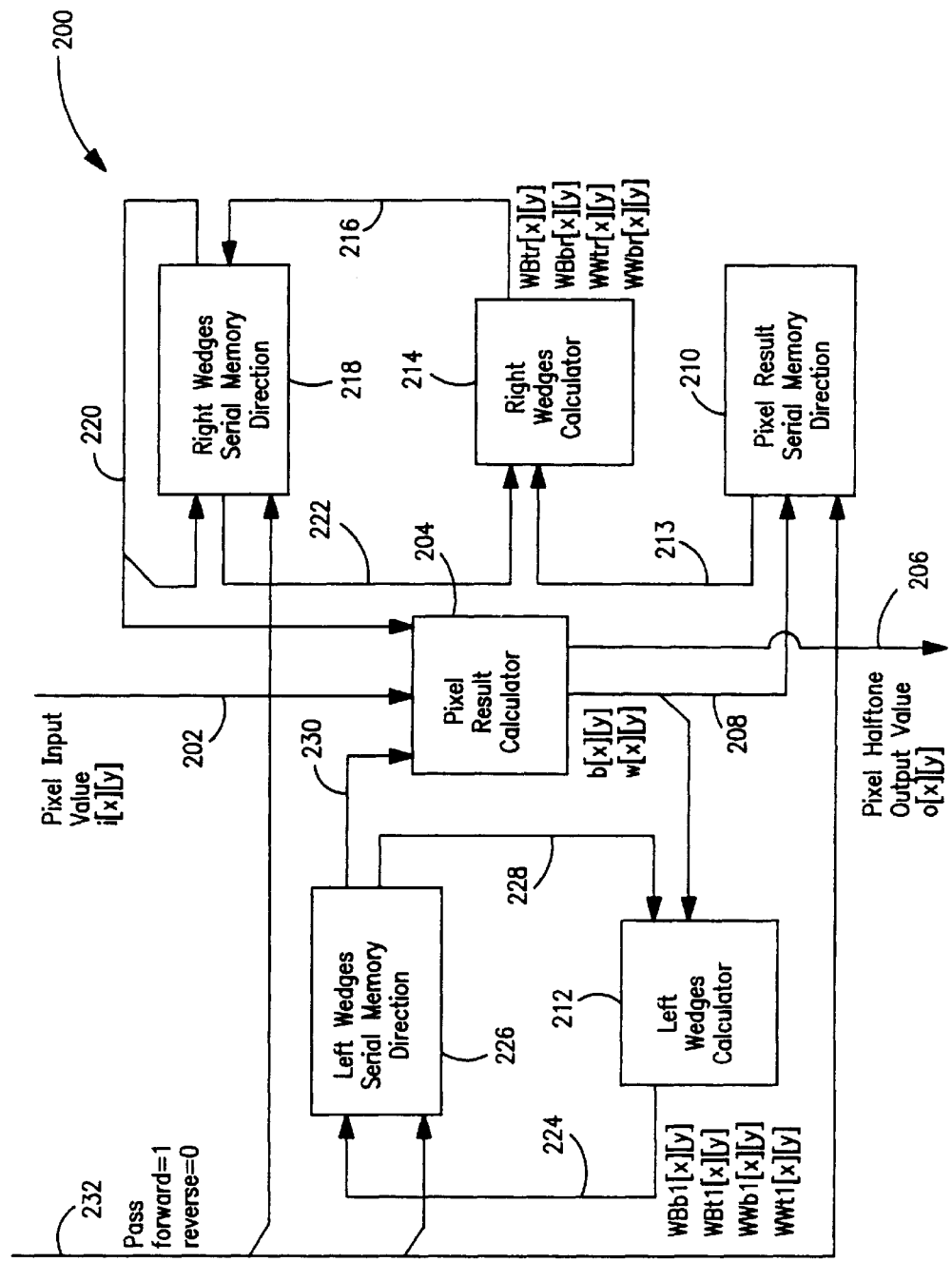
FIG. 17 is a schematic block diagram representation of a force field halftoning processor according to one embodiment.

Appendix 1 is a listing of an inverse force field map used for a software implementation of one embodiment;

Appendix 2 is a source code listing for a software implementation of a 2 level force filed halftoning process that uses the map of Appendix 1; and Appendix 3 provides a number of pseudo-code listings that depict the function and operation of the force field processor of FIG. 17.

DETAILED DESCRIPTION OF THE PREFERRED EMBODIMENTS

For the sake of simplicity, a first embodiment of the present invention will be described with reference to a monochrome output display, wherein each pixel value of an output image (the output pixel value) can take on a bi-level value of totally "off" or totally "on". For example, in a black and white output image, the output pixel value of totally "off" represents the black colour and totally "on" represents the white colour. In the monochrome case, an "off" pixel value will also be referred to hereunder as a black pixel value, and an "on" pixel value as the white pixel value.

The process described hereinafter equally applies to colour image displays or multilevel displays, where each independent colour of an output pixel of an image is independently processed or output pixel can take on two or more values respectively. For example, in the red, green and blue (RGB) component display format, the red colour component of an output pixel value can take a totally "on" or totally "off" value representing a presence or absence of the red colour respectively. In a substantially similar manner the green component and the blue component can be assigned a totally "on" or totally "off" values. In this manner, each of the red, green and blue colours can be halftoned independently.

Figure 1:
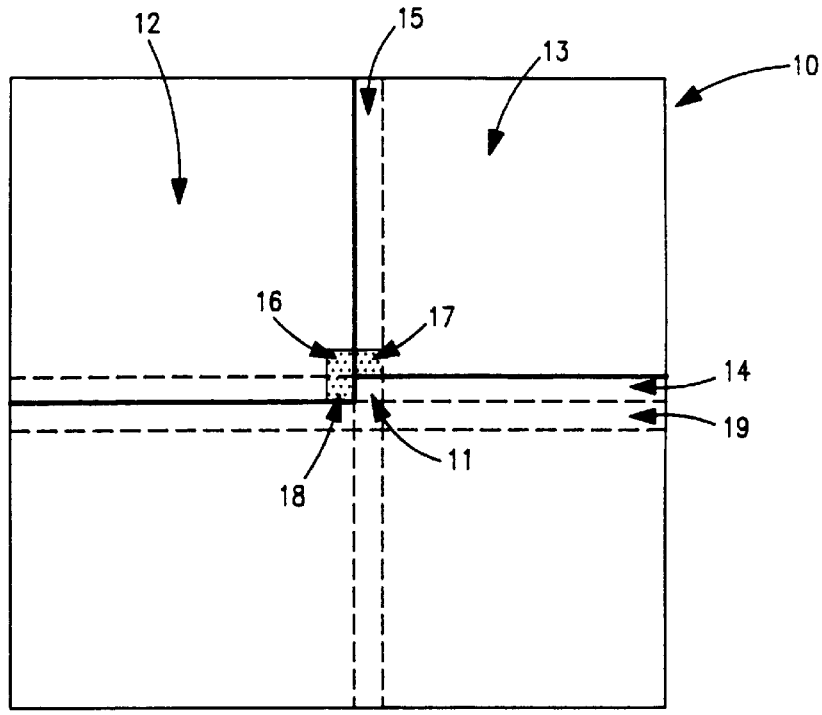
FIG. 1 illustrates an example of quadrant division of an image frame for use with a number of embodiments of the present invention.

Referring now to FIG. 1, there is shown an image 10, where an output pixel value of a current pixel 11 is to be determined. An upper left quadrant 12 and an upper right quadrant 13 of pixels of the image 10 whose output pixel values have been determined are also illustrated. The upper left quadrant 12 comprises all pixels whose output value are known and are in an upper left region of the image 10 relative to the current pixel 11. The upper right quadrant 13 comprises all pixels whose output value are known and are in an upper right region of the image 10 relative to the current pixel 11 including pixels on a current column 15 above the current pixel 11, but not including pixels on a current line 14, in which the current pixel 11 lies. It will be appreciated from FIG. 1, that for a display that is scanned in raster order, the "quadrants" mentioned above will not, in most instances, be representative of one quarter of the image 10. For example, for a current pixel on a first scan line of the image 10 there will be no upper right quadrant 13, and the upper left quadrant 12 will comprise only those pixels on the first scanline that have been halftoned. Similarly, for the first pixel of a last scan line of the image, there will be no upper left quadrant 12 and all pixels on all previous scanlines will be includes in the upper right quadrant 13. Accordingly, the term "quadrant" is used herein with some license to indicate an arbitrary area of previously halftoned pixels.

Figure 2:
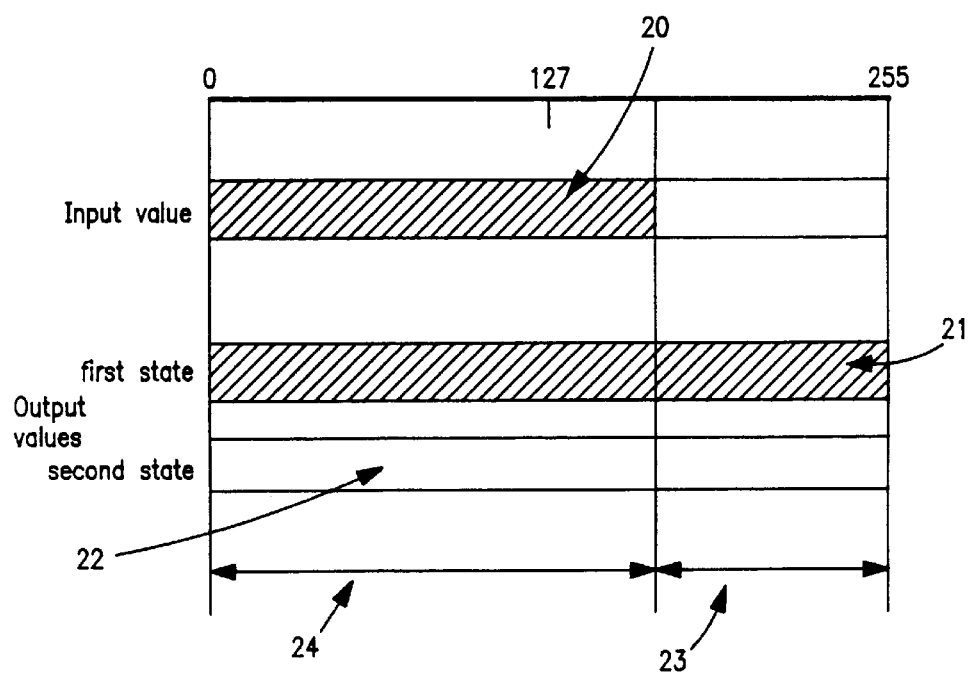
FIG. 2 is a schematic representation of an input value of a pixel and output pixel values utilised by the embodiments.

Referring now to FIG. 2, an input value 20 is shown for a current pixel 11 that can take on a single value between 0 and 255, thereby representing 256 Gray-scale levels from 0 (black) to 255 (white). An output value of the current pixel 11 can take on one of two possible states in a (bi-level monochrome case), a first state 21 being the totally "on" value (white colour value), and a second state 22 being the totally "off" value (black colour value).

One of the two possible states 21, 22 is chosen for the output pixel value of the current pixel 11 as described below, Further to determining the output value, an over result value and an under result value for the current pixel 11 are also determined following the outcome of the choice of the output pixel value of the current pixel 11. The over result value 23 and the under result value 24 shall be referred to hereinafter for the described monochrome example as the excess white value ($w_{x,y}$) and the excess black value ($b_{x,y}$) respectively.

If the current pixel 11 output value is chosen to be the white colour value 21, then the excess white value ($w_{x,y}$) for the current pixel 11 is assigned a value 23 equal to a difference between the white colour value 21 and the input value 20 of the current pixel 11. Following the choice of a white colour value 21 as the current pixel 11 output value, the excess black value ($b_{x,y}$) for the current pixel 11 is assigned the value of zero.

Alternatively, if the current pixel 11 output value is chosen to be the black colour value 22, then the excess white value ($w_{x,y}$) for the current pixel 11 is assigned the value zero and the excess black value ($b_{x,y}$) for the current pixel 11 is assigned a value 24 equal to the input value 20.

Consequently, each previously halftoned pixel, wherein the output pixel value has been determined, has associated therewith an excess white value ($w_{i,j}$) and an excess black value ($b_{i,j}$).

Figure 3:
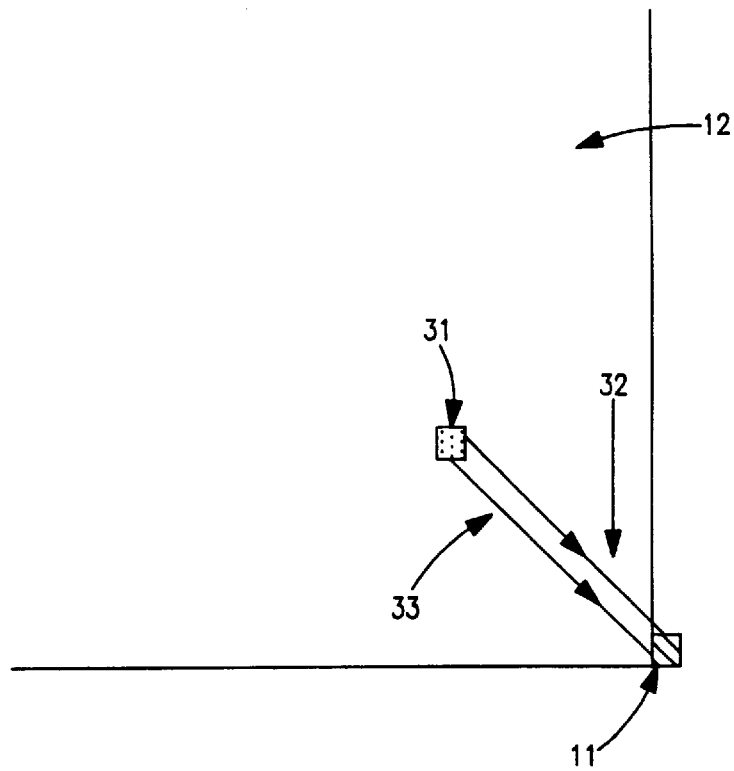
FIG. 3 is a schematic representation of a white and black repulsive force between, a halftoned pixel and a current pixel in accordance with the embodiments of the present invention.

Referring now to FIG. 3, there is shown in more detail the upper left quadrant 12 of FIG. 1. A previously halftoned pixel 31 will have associated therewith an excess white value 23 and an excess black value 24 as well as an output value.

A "white repulsive force" 32 and a "black repulsive force" 33 are determined between the current pixel 11 and the previously halftoned pixel 31. The "white repulsive force" 32 is a measure of a tendency to not choose a white colour value 21 for the output value of the current pixel 11. The "black repulsive force" 33 is a measure of a tendency to not choose a black colour value 22 for the output value of the current pixel 11.

The white repulsive force 32 between the current pixel 11 and the halftoned pixel 31 is determined by a product of three values, being firstly a weight value, secondly the white excess value of the halftoned pixel 31, previously determined, and thirdly the white excess value of the current pixel 11, which results when the current pixel is chosen to have the white colour value 21 as the output value.

The black repulsive force 33 between the current pixel 11 and the halftoned pixel 31 is determined by a product of three values, being firstly a weight value, secondly the black excess value of the halftoned pixel 31, and thirdly the black excess value of the current pixel 11, which results when the current pixel is chosen to have the black colour value 22 as the output value.

Hence, the current pixel 11 has associated therewith the above mentioned white repulsive force 32 and black repulsive force 33 between itself and the halftoned pixel 31. Corresponding forces also exist between the current pixel 11 and each other halftoned pixel.

In the preferred embodiment, an over result repulsive measure (hereinafter referred to as the "total white repulsive force") and an under result repulsive measure (hereinafter referred to as the "total black repulsive force") are each determined for the current pixel 11 from all previously halftoned pixels in the upper left quadrant 12 and the upper right quadrant 13.

The total white repulsive force for the current pixel 11 is given by the sum of the white repulsive force 32 for each halftoned pixel 31. In a similar manner, the total black repulsive force for the current pixel is given by the sum of the black repulsive force 33 for each halftoned pixel 31.

An output value of the current pixel 11 is determined from a comparison between the total white repulsive force and the total black repulsive force for the current pixel 11. If the total white repulsive force of the current pixel 11 is less than the total black repulsive force of the current pixel 11, the output value of the current pixel 11 is assigned the white colour value 21. Alternatively, if the total black repulsive force of the current pixel 11 is less than the total white repulsive force of the current pixel 11, the output value of the current pixel 11 is assigned the black colour value 22.

The total black repulsive force "$Fb_{x,y}$" and the total white repulsive force "$Fw_{x,y}$" for a current pixel at coordinate position (x,y) can be expressed by the following equations;

$$Fb_{x,y} = \sum_{i,j} X_{i,j} b_{i,j} b_{x,y} \qquad \text{(EQ 1)}$$

$$Fw_{x,y} = \sum_{i,j} X_{i,j} w_{i,j} w_{x,y} \qquad \text{(EQ 2)}$$

where $X_{i,j}$ are predetermined weight values, $b_{i,j}$ is the black excess value, and $w_{i,j}$ is the white excess value of a previously halftoned pixel at a line number "j" counting from the top of the image and pixel position number "i" counting from the left side of the image For example, coordinate of a pixel in the top most left corner of the image is i=1 and j=1.

The $b_{x,y}$ is the excess black value for the current pixel 11 assuming that the current pixel output value is chosen to be the black colour value 22.

The $w_{x,y}$ is the excess white value for the current pixel 11 assuming that the current pixel output value is chosen to be the white colour value 21.

Figure 4:
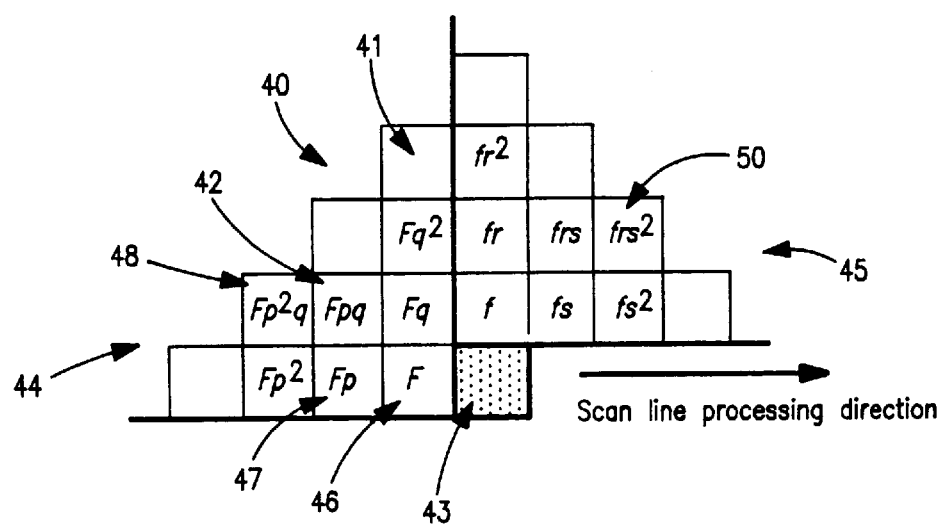
FIG. 4 represents an example of an set of weight values utilised in the determination of the under result and the over result repulsive measure in accordance with a number of embodiments of the present invention.

Referring now to FIG. 4, there is shown a set 40 of coefficients utilized in the determination of the total white repulsive force or the total black repulsive force for the current pixel 11. Each cell position 41 of the set 40 has associated therewith a predetermined coefficient being a weight value 42 to which the excess white value or the excess black value is multiplied in the determination of the total white repulsive force or total black repulsive force for the current pixel 11 respectively.

The set 40, as illustrated in FIG. 4, is divided into left quadrant weight values 44 and right quadrant weight values 45. so that each cell position 41 corresponds to a position of a previously halftoned pixel in the upper left pixel quadrant 12 and the upper right pixel quadrant 13 respectively.

A lead cell position 43 of the set 40 corresponds to the position of the current pixel 11 being processed, and no coefficient is associated with this lead cell position 43.

Preferably, the left quadrant weight values 44 of the set 40 has a cell entry in a first column, first row having a predetermined weight value "F" 46, the second column, first row having a weight value equal to the predetermined weight value of the first row, first column multiplied by a first predetermined ratio "p" to form the weight value "Fp" 47. In this manner, each cell entry of the left quadrant weight values 44 takes on a weight value equal to the weight value of the cell entry to the immediate right position multiplied by the first predetermined ratio "p". Further for each row above the first row of the left quadrant weight values 44, a cell entry in the row takes on a weight value equal to the weight value of the cell positioned immediate below multiplied by a second predetermined ratio "q". For example, the weight value of the cell entry two columns to the left of the first column and one row above the first row takes on the value "$Fp^2q$" 48.

Similarly, the right quadrant weight values 45 of the set 40 has a cell entry in a first column, first row "f" 49, so that for example the cell entry two columns to the right and one row above has a weight value of "$fsr^2$" 50. In other words, a cell entry of the right quadrant weight values 45 takes on a value equal to the value of the cell of the first column, first row multiplied by a third predetermined ratio "s" raised to the power of the number of columns away from the first column and further multiplied by a fourth predetermined ratio "r" raised to the power of the number of rows away from the first row.

The weight values (coefficients) of the set 40 are represented in Equation 1 and Equation 2 by $X_{i,j}$.

The total white repulsive force for the current pixel 11 is determined by summing the product of each weight value of the set 40 by the excess white value ($w_{i,j}$) for each corresponding halftoned pixel and the excess white value ($w_{x,y}$) of the current pixel 11 (assuming the current pixel output value is chosen as the white colour value) over all halftoned pixels (see Equation 2). The total black repulsive force for the current pixel 11 is also determined, in substantially the same manner as the total white repulsive force, wherein the excess black values ($b_{i,j}$) of previously halftoned pixels and the excess black value ($b_{x,y}$) of the current pixel 11 (assuming the current pixel output value is chosen as the black colour value) are utilized accordingly (see Equation 1).

The total black repulsive force and the total white repulsive force for the current pixel 11 can be determined from contributions to the respective force by each of the upper left 12 and upper right 13 halftoned pixel quadrants.

A white left quadrant value ($QWleft_{x-1,y}$) can be determined by summing the product of each weight value of the left quadrant weight values 44 with the excess white value ($w_{i,j}$) of the corresponding halftoned pixel in the upper left quadrant 12 of halftoned pixels.

A white right quadrant value ($QWright_{x,y-1}$) can be determined by summing the product of each weight value of the right quadrant weight values 45 with the excess white value ($w_{i,j}$) of the corresponding halftoned pixel in the upper right quadrant 13 of halftoned pixels.

Similarly a black left quadrant value ($QBleft_{x-1,y}$) and a black right quadrant value ($QBright_{x,y-1}$) can be determined.

The total black repulsive force "$Fb_{x,y}$" and the total white repulsive force "$Fw_{x,y}$" for the current pixel at coordinate position (x,y) can then be expressed by the following equations:

$$Fb_{x,y} = (QBleft_{x-1,y} + QBright_{x,y-1}) * b_{x,y}$$

$$Fw_{x,y} = (QWleft_{x-1,y} + QWright_{x,y-1}) * w_{x,y}.$$

Although a significant speed advantage can be gained by halftoning a row of pixels with every pass of a row of pixels, in order to reduce memory requirements, it is generally required that two passes of tie halftoning process are required per row of pixels to determine the total white and total black repulsive force for each pixel. A two pass halftoning process per row of pixels can now be described.

On a first pass of a single row (y) of pixels proceeding from left to right, for each pixel at coordinate position (x,y), the output value of the pixel is determined using quadrant values $QBleft_{x-1,y}$ and $QBright_{x,y-1}$ and $QWleft_{x-1,y}$ and $QWright_{x,y-1}$ and also new left quadrant values $QBleft_{x,y}$ and $QWleft_{x,y}$ are determined. During a second pass of the same row (y) of pixels proceeding from right to left, for each pixel at coordinate position (x,y), new right quadrant values $QBright_{x,y}$ and $QWright_{x,y}$ are determined.

Alternatively, a speed advantage, obtained at the cost of use of extra memory, can be gained by a single pass halftoning process per row of pixels which is now described.

Each row (y) of pixels is processed either in the direction from left to right or in the direction from right to left; and the processing direction is opposite to the preceding row (y-1) of pixels.

If the row (y) of pixels is processed from left to right, then, for each pixel at coordinate position (x,y), left quadrant values $QBleft_{x-1,y}$ and $QWleft_{x-1,y}$ are determined, and the output value of the pixel is determined using quadrant values $QBleft_{x-1,y}$ and $QBright_{x,y-1}$ and $QWleft_{x-1,y}$ and $QWright_{x,y-1}$ and also new left quadrant values $QBleft_{x,y}$ and $QWleft_{x,y}$ are determined.

Figure 5:
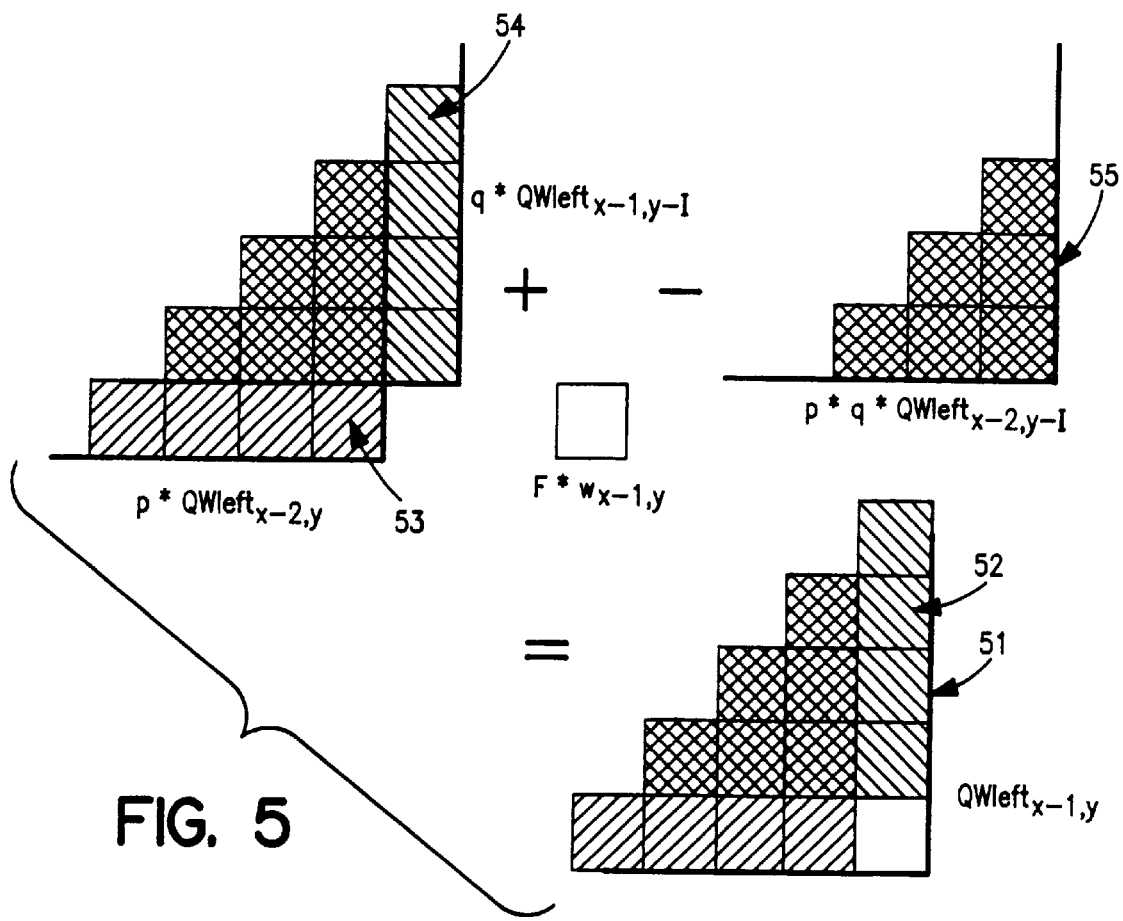
FIG. 5 schematically represents an example of a contributive portion of the over result repulsive measure by an upper left quadrant of halftoned pixels and its determination thereof in accordance with a number of embodiments.

If the row (y) of pixels is processed from right to left, then, for each pixel at coordinate position (x,y), right quadrant values $QBright_{x+1,y}$ and $QWright_{x+1,y}$ are determined, and the output value of the pixel is determined using quadrant values $QBleft_{x,y-1}$ and $QBright_{x+1,y}$ and $QWleft_{x,y-1}$ and $QWright_{x+1,y}$ and also new right quadrant values $QBright_{x,y}$ and $QWright_{x,y}$ are determined, Referring now to FIG. 5, there is shown a diagrammatic description of the preferred method of determining a white left quadrant value. A black left quadrant value and a white right quadrant value and a black right quadrant value can be determined in a substantially similar manner.

A white left contribution quadrant, 51, shown in FIG. 5, has each entry 52 of this quadrant given by a multiplication of a white excess value of a halftoned pixel in the upper left quadrant 12, and a corresponding weight value 42 of the left quadrant weight values 44 then summed over all pixels in the upper left quadrant 12 so as to produce a single value, $QWleft_{x-1,y}$, for the white left contribution quadrant 51.

A single value, $QWleft_{x-2,y}$, for the white left contribution quadrant 53 of pixel 18 to the left of the current pixel 11 and a single value, $QWleft_{x-1,y-1}$ for the white left contribution quadrant 54 of pixel 17 above the current pixel is determined prior to halftoning the pixels 17 and 18. Further, a single value. $QWleft_{x-2,y-1}$ for the white left contribution quadrant 55 of pixel 16 positioned above and to the left of the current pixel 11 is determined prior to halftoning pixel 16.

The single value, $QWleft_{x-1,y}$ for the white left contribution quadrant 41 of the current pixel 11, the current pixel having coordinate position (x,y) is determined by the following recursive equation:

$$QWleft_{x-1,y}=F*w_{x-1,y}+p*QWleft_{x-2,y}+q*QWleft_{x-1,y-1}-p*q*QWleft_{x-2,y-1},  \quad (EQ\ 3)$$

where $w_{x-1,y}$ is the white excess value of the pixel 18 to the left of the current pixel 11. Hence the white left quadrant value, $QWleft_{x-1,y}$ for the current pixel 11 is determined in a recursive manner from the white left quadrant values, $QWleft_{x-2,y}$, $QWleft_{x-1,y-1}$, $QWleft_{x-2,y-1}$ previously determined prior to halftoning the adjacent pixels 16, 17 and 18 (F being the predetermined weight value 46).

Upon the determination of the total white repulsive force and the total black repulsive force for the current pixel 11, the total white repulsive force is compared to the total black repulsive force of the current pixel 11. If the total white repulsive force is less than the total black repulsive force, the output value of the current pixel 11 is assigned the white colour value 21. Alternatively, if the total white repulsive force is greater than the total black repulsive force the output value of the current pixel 11 is assigned the black colour value 22. In the case where the total white and total black repulsive force are equal the output value of the current pixel 11 is arbitrarily assigned either the black 22 or white 21 colour value.

The determination of the total white repulsive force and the total black repulsive force of previously halftoned pixels to a current pixel is not limited to the computational technique described with reference to FIG. 4 and FIG. 5. For example, the total white and black repulsive force for a current pixel can be determined by applying Equation 2 and Equation 1 to any region of previously halftoned pixels and the current pixel, the previously halftoned pixels having associated therewith an excess white value and an excess black value as hereinbefore described.

At a first pixel of an image, typically, no previously halftoned pixels are present in the image and in this case the first pixel of the image is halftoned by assigning to the output value the closest chosen output state value to the input value (ie. error diffused). As an alternative, the first pixel can be dithered.

Figure 6:
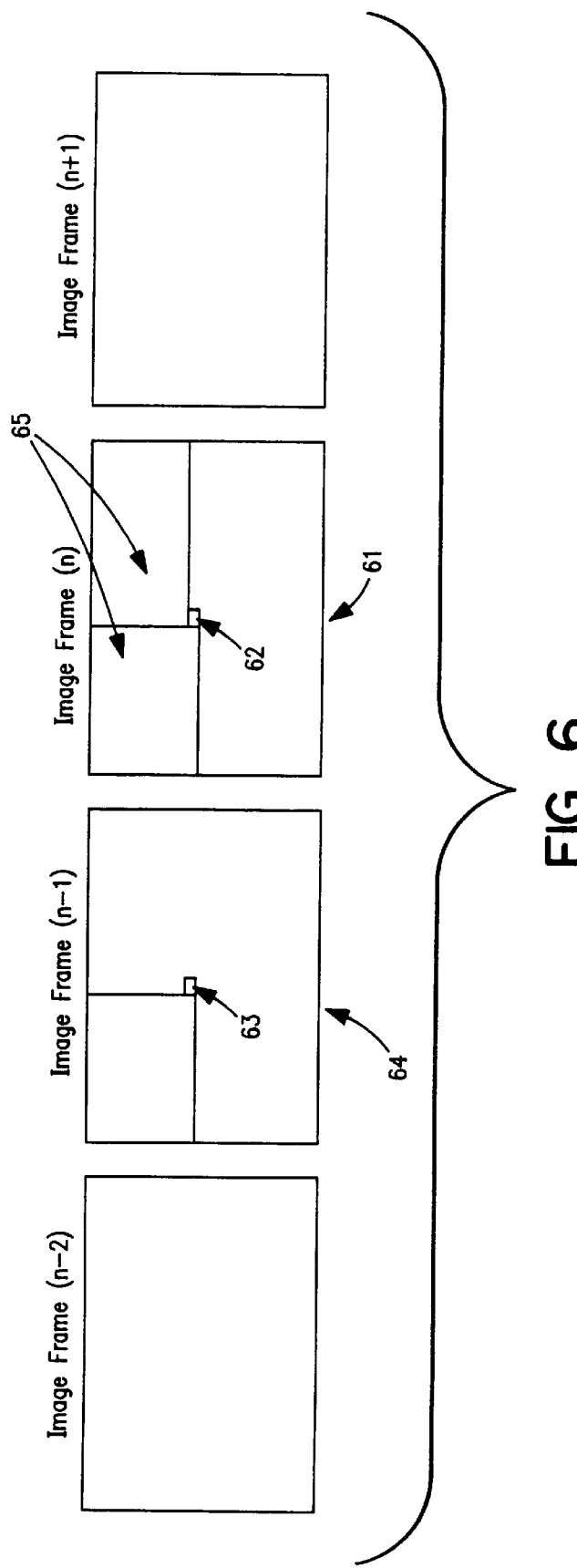
FIG. 6 is a schematic diagram of halftoning an image sequence in accordance with the second and third embodiments of the present invention.

A second embodiment of the present invention, being a variation on the first embodiment, can be described with reference to FIG. 6. Illustrated in FIG. 6 is a sequence of image frames 60 forming part of a moving picture, for example, video images having motion data or characteristic noise data.

In this embodiment, a current pixel 62 of a current image frame (n) 61 is assumed to take on an output value equal to the output value of a corresponding pixel 63 of a previous image frame (n-1) 64. For example, in the monochrome case, if the output value of the corresponding pixel 63 is the white colour value, the current pixel 62 is assumed to take on an output value equal to the white colour value.

A total white repulsive force for the current pixel 62 is then determined between regions 65 of previously halftoned pixels of the current image frame (n) 61 and the current pixel 62 which is assumed to have the white colour value. The total white repulsive force for the current pixel 62 is determined as described above with reference to FIGS. 3, 4 and 5. If the total white repulsive force for the current pixel 62 is less than a first threshold value equal to the sum of the excess black repulsive force for the current pixel 62 and a first threshold increment value, the output value of the current pixel 62 is assigned a value equal to the output value of the corresponding pixel 63 of the previous image frame (n-1) 64.

This can be expressed in the following manner, where the output value for a corresponding pixel of the previous frame is known, for example stored in a frame memory, that output value is accepted if:

$$F_{prev.} < \min(Fb,Fw) + \text{threshold increment}.$$

The threshold increment value can be a fixed value preset for the particular display or type of image being displayed.

Preferably however, the threshold increment varies as some function of the image content. For example, the threshold increment can be a function of the input value (grey level) of a pixel. Alternatively, the threshold increment can be determined from a function of local edge conditions, or from a function of the local grey level, or from a function of the local amount of change in pixel input values between image frames, or as a combination of these functions, where local refers to use of nearby pixels in determining the function value.

Similarly, if the corresponding pixel 63 of the previous image frame (n–1) 64 has an output value equal to the black colour value, a total black repulsive force for the current pixel 62 is determined and compared to a second threshold value. If the total black repulsive force for the current pixel 62 is less than a second threshold value, the second threshold value being equal to the sum of the excess white repulsive force for the current pixel 62 and a second threshold increment value, the output value of the current pixel 62 of the current frame (n) 61 is assigned a value equal to the output value of the corresponding pixel 63 of the previous image frame (n–1) 64.

In the case where the output value of the corresponding pixel 63 of the previous frame is the white colour value and the total white repulsive force for the current pixel 62 is not less than the first threshold value, or in the case where the output value of the corresponding pixel 63 of the previous frame is the black colour value and the total black repulsive force for the current pixel 62 is not less than the second threshold value, then both a total white repulsive force and a total black repulsive force is determined for the current pixel 62 on the basis that the output value of the current pixel 62 can take on either a white colour value or a black colour value (as described by the first embodiment). In this case, the total white repulsive force and the total black repulsive for the current pixel 62 are compared to determined which of the forces (white repulsive or black repulsive) has the lowest value. If it is determined that the total white repulsive force is less than the total black repulsive, the output value of the current pixel 62 is assigned the white colour value. If, however, it is determined that the total black repulsive force is less than the total white force, the output value of the current pixel 62 is assigned the black colour value, Finally, where the total white repulsive force for the current pixel 62 is equal to the total black repulsive force for the current pixel 62, the output value of the current pixel 62 is arbitrarily assigned either the black or white colour value.

In a further embodiment, adapted from the second and third embodiments, force field halftoning can be combined with any other method of halftoning to halftone one or more images or image frames.

That is, firstly the output value of the current pixel 11 of an image frame is determined by any method of halftoning. Then, similarly to the second and third embodiments, that output value is accepted if the repulsive force associated with that output value of the current pixel is less than the sum of the minimum repulsive force achievable for any output value of the current pixel and a threshold value. In the event that the predetermined output value is not accepted, then the output value of the pixel is assigned an output value which provides the minimum achievable repulsive force for the pixel.

A third embodiment of the present invention is substantially as the second embodiment, excepting that the output value of the current pixel 62 is not assumed to take on the output value of the corresponding pixel 63, but is determined by a process of dithering. An input value of the current pixel 62, of the current image frame 61 in the sequence of image frames 60, is compared to a dither value of a dither matrix to select a dithered output value for the current pixel 62. The output value of the current pixel 62 takes on the dithered output value, instead of the output value of the corresponding pixel 63 described in the second embodiment. Upon the selection of the dithered output value as the output value, the third embodiment proceeds as described in the second embodiment, to determine if the dithered value is to be assigned as the output value of the current pixel 62 or if the output value is to be determined by finding the least value between a total white repulsive force and a total black repulsive force for the current pixel 62 as previously described. The third embodiment thus is representative of a combination of force-field halftoning and dithering.

Figure 7A:
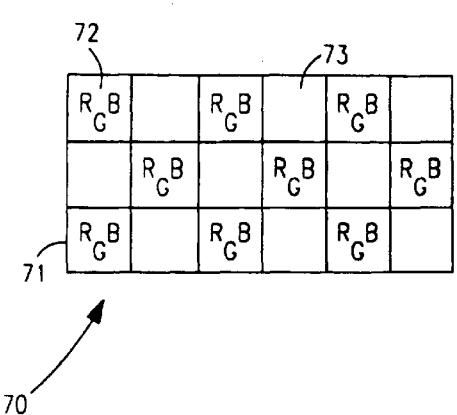
FIGS. 7A and 7B respectively illustrate the effects of standard dithering and anti-correlated dithering.
Figure 7B:
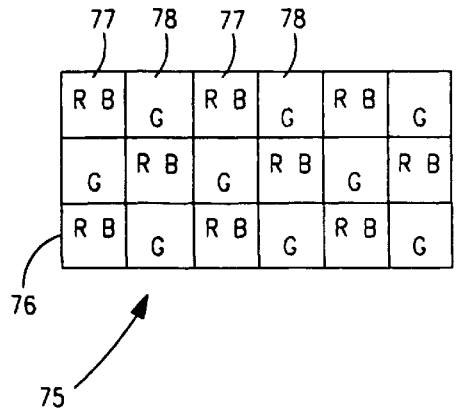

When the third embodiment is applied in colour display systems, it is advantageous that the dithering process be anti-correlated, For example, where each pixel includes red, green and blue pixel elements, anti-correlation makes use of the fact that the luminance of green is approximately equal to the summed luminance of red and blue. The effect of this is seen from a comparison of FIG. 7A with FIG. 7B. In FIG. 7A, a traditional dithered image is depicted reproducing a mid-level grey tone on an RGB bi-level display 70. With a mid-level grey tone, half 72 of the pixels 71 are enabled with each thus emitting red, green and blue. The other half 73 of the pixels 71 are disabled, thus giving 50% intensity. However, with anti-correlate(d dithering, shown in FIG. 7B, only selected colours in each pixel 76 of a display 75 are enabled. The selected colours include red and blue in pixels 77, and green in the other, alternate pixels 78. Because the luminance transitions between pixels is reduced, a better quality image is perceived by the eye, compared with the display of FIG. 7A.

Figure 8A:
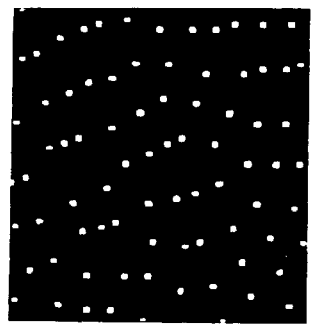
FIGS. 8A, 8B and 8C comparatively illustrate the halftoning effects of error diffusion, dithering and force field halftoning respectively.
Figure 8B:
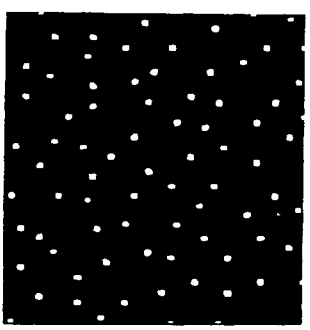
Figure 8C:
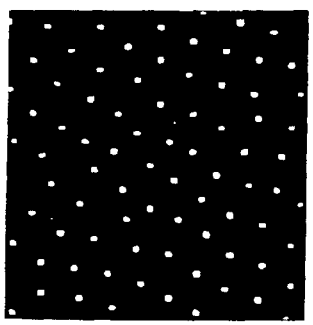

One example of the relative performance of force-field halftoning as described herein can be compared with prior halftoning methods, the results of which are seen in FIGS. 8A, 8B and 8C, where a single tone grey scale image has been halftoned. FIG. 8A illustrates a characteristic halftone pattern produced by error diffusion. The pattern displays a well known "wave-like" pattern, which many in the art refer to) as "worms". FIG. 8B illustrates a characteristic halftone pattern produced from the same input by dithering in which it is noted that the pattern is random but the instances of pixels turned on (white pixels) is not optimally spread. In contrast, the characteristic halftone pattern produced from the same input by force field halftoning as described herein is shown in FIG. 8C which produces a near optimally spread pattern thus being a noticeable improvement over the processes of dithering and error diffusion, at least for certain classes of images. A second example of improved performance of force field halftoning, in this case with respect to error diffusion, occurs in the halftoning of sequences of images and in the reduction of sparkling noise mentioned above. In particular, the third embodiment involving the mixing of force field halftoning and dithering causes the displayed halftone image to become more stable thus affording a better halftone pattern over the entire sequence.

A third example of improved performance of force field halftoning, in this case with respect to dithering, occurs in the halftoning of image details including text and region edges.

In the embodiments described with reference to FIGS. 1 to 5, the various force field halftone calculations carried out were based upon the influence of previously processed pixels divided into "quadrants" of the image being displayed. Importantly, as clearly seen in FIG. 4, the influence of the coefficients p, q, r and s on the corresponding pixels and their contribution to the calculation of force as it applies to the current pixel 43, drops away in equal amounts in each direction from the current pixel 43. Accordingly, for example, if p=q and r=s in FIG. 4, the reducing influence of the coefficients can be represented by a corresponding diagonal line that creates a diamond or triangular shape with respect to the current pixel 43.

The present inventor has determined that more optimal results occur where the influence of previously halftoned pixels is substantially proportional to the distance between the halftoned pixel and the current pixel. Accordingly, whereas FIG. 4 illustrates a diamond or triangular-shaped influence, the most optimised influence is that represented by a circle centred upon the current pixel. The present inventor has determined that the circle optimisation can be approximated by dividing the two quadrants of previously halftoned pixels into a number of "wedges" that extend substantially radially from the current pixel.

Figure 9:
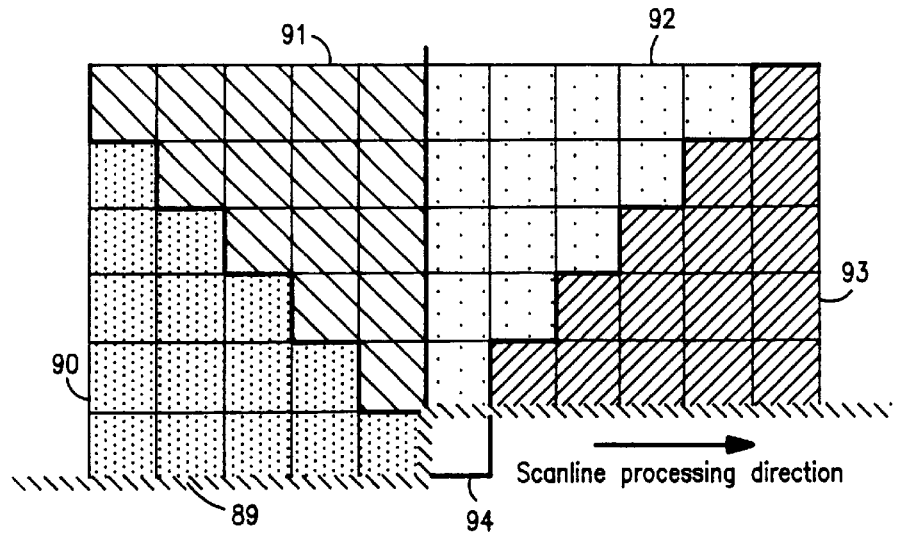
FIG. 9 depicts a further embodiment of force field halftoning based upon dividing the preceding portions of the image into wedges.

In FIG. 9, the previous two quadrants 12 and 13 of FIG. 1, are divided into four wedges 90, 91, 92, and 93 used for the halftoning of a current pixel 94 and include all previously processed pixels above the broken line 89. These four wedges 90–93 provide four wedge values for excess black results and four wedge values for excess white results, in which each wedge value summaries the influence on the current pixel 94 of previously processed pixels within the corresponding wedge of pixels.

As with force field halftoning using quadrant values, the present embodiment of force field halftoning using wedge values, processes an image on a scanline-by-scanline basis, from the top of the image to the bottom. The processing for each scanline typically consists of a forward pass followed by a reverse pass of the same scanline illustrated in FIGS. 10 and 11. However, processing can also consist of a single pass per scanline in a similar manner to the description above of force field halftoning using quadrant values.

Figure 10:
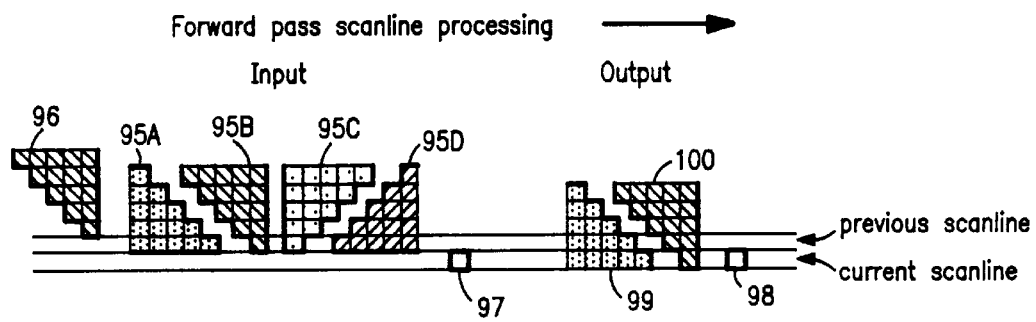
FIGS. 10 and 11 depict forward and reverse pass scanline processing in the embodiment of FIG. 9.

As seen in FIG. 10, in forward pass processing of a scanline, the input data consists of:

wedge values 95A, 95B, 95C and 95D for the previous scanline;

"top left" wedge values 96 for the line before the previous scanline; and input values 97 for pixels of the current scanline.

The calculated output data consists of:

halftone output values, excess black values and excess white values 98 for pixels of the current scanline; and "bottom left" 99 and "top left" 100 wedge values for the current scanline.

Figure 11:
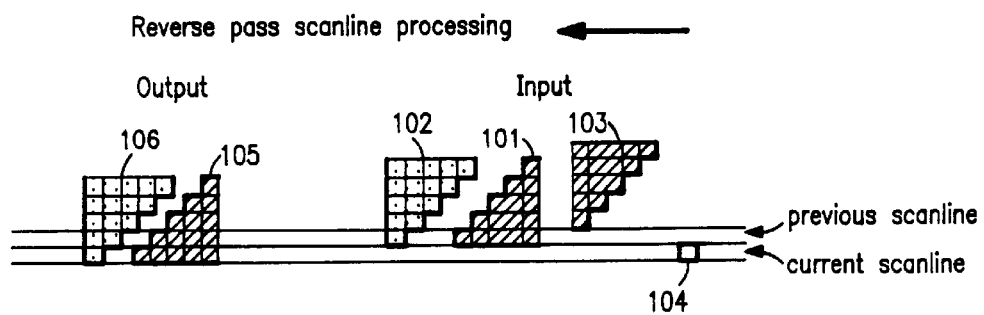

In the reverse processing of a scanline, depicted in FIG. 11, the input data consists of:

"bottom right" 101 and "top right" 102 wedge values of the previous scanline;

"top right" wedge values 103 for the line before the previous scanline; and excess black values and excess white values 104 for the pixels of the current scanline.

The calculated output data consists of:

"bottom right" 105 and "top right" 106 wedge values for the current scanline.

For the embodiment of FIGS. 9, 10 and 11, the current pixel result is determined after calculating the total black repulsive force, "$Fb_{x,y}$" and the total white repulsive force, "$Fw_{x,y}$" for the current pixel at co-ordinate position x,y. The total black repulsive force, "$Fb_{x,y}$" is calculated using wedge values as follows:

$$Fb_{x,y}=\Sigma_{i,j}X_{i,j}b_{i,j}b_{x,y}=(F_{left}*WBbl_{x-1,y}+F_{top\_left}*WBtl_{x-1,y-1}+F_{top}*WBtr_{x,y-1}+F_{top\_right}*WBbr_{x+1,y-1})*b_{x,y}$$

where:

$F_{left}$, $F_{top\_left}$, $F_{top}$, $F_{top\_right}$, and $F_{right}$ are predetermined weight values; and $WBbl_{x,y}$=excess black wedge value for the bottom left wedge of pixels with corner pixel x,y =$\Sigma_{i,j}$ in the bottom left wedge of pixels with corner pixel at x,y $X_{ij}$ $b_{ij}$.

A similar determination applies also for $WBtl_{x,y}$, $WBtr_{x,y}$, and $WBbr_{x,y}$.

Similarly, the total white repulsive force, "$Fw_{x,y}$" is calculated using wedge values as follows:

$$Fw_{x,y}=\Sigma_{i,j}X_{i,j}w_{i,j}w_{x,y}=(F_{left}*WWbl_{x-1,y}+F_{top\_left}*WWtl_{x-1,y-1}+F_{top}*WWtr_{x,y-1}+F_{top\_right}*WWbr_{x+1,y-1})*w_{x,y}$$

where:

$WWbl_{x,y}$=excess white wedge value for the bottom left wedge of pixels with corner pixel x,y =$\Sigma_{i,j}$ in the bottom left wedge of pixels with corner pixel at x,y $X_{ij}$ $w_{ij}$.

A similar determination applies also for $WWtl_{x,y}$, $WWtr_{x,y}$, $WWbr_{x,y}$.

Figure 12A:
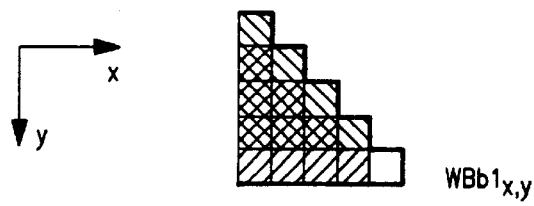
FIGS. 12A to 12D depict the wedge calculations for the embodiment of FIG. 9.

The calculation of the "bottom left", "top left", "bottom right" and "top right" wedge values can now be recited in the following manner:

For the wedge depicted in FIG. 12A:

$$WBbl_{x,y}=b_{x,y}+F_{left}*WBbl_{x-1,y}+F_{top\_left}*WBbl_{x-1,y-1}-FF_{left}*F_{top\_left}*WBbl_{x-2,y-1}.$$

Figure 12B:
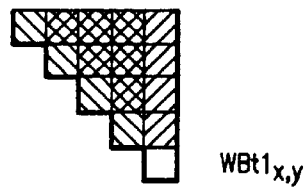

For the wedge depicted in FIG. 12B:

$$WBtl_{x,y}=b_{x,y}+F_{top\_left}*WBtl_{x-1,y-1}+F_{top}*WBtl_{x,y-1}-F_{top\_left}*F_{top}*WBtl_{x-1,y-2}.$$

Figure 12C:

For the wedge depicted in FIG. 12C:

$$WBtr_{x,y}=b_{x,y}+F_{top}*WBtr_{x,y-1}+F_{top\_right}*WBtr_{x+1,y-1}-F_{top}*F_{top\_right}*WBtr_{x+1,y-2}.$$

Figure 12D:

For the wedge depicted in FIG. 12D:

$$WBbr_{x,y}=b_{x,y}+F_{top\_right}*WBbr_{x+1,y-1}+F_{right}*WBbr_{x+1,y}-F_{top\_right}*F_{right}*WBbr_{x+2,y-1}.$$

The formulae for $WWbl_{x,y}$, $WWtl_{x,y}$, $WWtr_{x,y}$, and $WWbr_{x,y}$ are similar.

Figure 13:
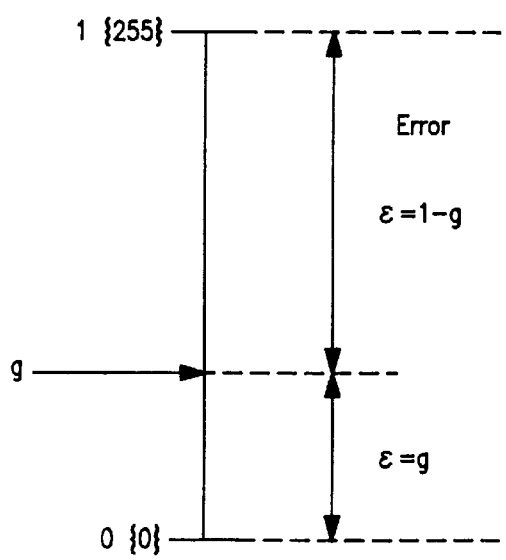
FIG. 13 depicts the errors produced in image halftoning for an arbitrary input value.

A further embodiment of the present invention is provided by altering the type of error measure used to determine the over result value (eg. excess white value) and the under result value (eg, excess black value). In this connection, FIG. 13 illustrates the selection of a halftone output value based on an input pixel value g within the range of 0 (representing no output pixels enabled, and therefore black in a monochrome case) and 1 (representing all pixels enabled, and therefore a white in a monochrome case), for an 8-bit range of input values. A standard error in the actual output value for each of excess white and excess black can be defined as follows:

$$\epsilon_{xb}=1-g$$

$$\epsilon_{xw}=g$$

Given this, a new error measure can be defined as:

$$\varepsilon' = \frac{1}{1-\varepsilon}$$

By defining the new error measure $\varepsilon'$, the ratio of the errors can be preserved. In this manner, the modified error for excess black and excess white can be defined as follows:

$$\varepsilon'_{xb} = \frac{1}{1-(1-g)} = \frac{1}{g}$$

$$\varepsilon'_{xw} = \frac{1}{1-g}$$

Using the modified error measure, for images with a constant grew level, there is no change in output results. However, for images with many grey levels, it can be shown that using the modified error measure, on average, the influence, of a region of halftoned pixels on a current pixel is independent of the grey level of the region of halftoned pixels.

That is, if the region of halftoned pixels has a grey level $g_1$, then on average, a fraction of $g_1$ of the pixels in the region are turned on and a fraction of $(1-g_1)$ are turned off.

If a pixel of the region is selected at random, the probability that the pixel is on is $g_1$ and the probability that it is off is $(1-g_1)$.

That is, the expected value of excess black error, using the modified error measure, for a pixel of the region of halftoned pixels is:

$$g_1 * e'_{xb} = g_1 * 1/g_1 = 1.$$

Similarly, the expected value of excess white error, using the modified error measure, for a pixel of the region of halftoned pixels is:

$$(1-g_1) * e'_{xw} = (1-g_1) * 1/(1-g_1) = 1.$$

That is, the expected influence of pixels in a region of halftoned pixels is independent of the grey level of the region of halftoned pixels. As a result, the modified error measure avoids production of artefacts where the image changes in grey levels.

With the above described embodiments there is no guarantee that the correct number of pixels will be turned on to represent to any particular grey level. It is desirable that the average halftone output grey level is very close to the input grey level.

For the first embodiment of force field halftoning as previously described, denote by FF(g) the average halftone output grey level produced when an image of constant grey level g, where 0<=g<=1, is halftoned.

It is found that FF(g) although close to g, is not very close to g as would be ideal. However, it is found that FF(g) is a monotonic increasing function. That is for 2 grey levels $g_1$, $g_2$ with $g_1<g_2$, then $FF(g_1)<=FF(g_2)$ Also FF(0)=0 and FF(1)=1.

This means there exists an inverse function $FF^{-1}$ which maps from the interval [0,1] onto the interval [0,1] such that $FF(FF^{-1}(g))=g$.

By including a re-mapping of input data in force field halftoning, where each pixel input values, g, is re-mapped to $FF^{-1}(g)$, force field halftoning now has the required property that the average halftone output grey level produced when an image of constant grey level g is halftoned, is very close to g.

In a preferred implementation, the pre-processing of the input pixels can be performed using a look-up table.

A further modification arises from the third embodiment where the output value of the current pixel is initially determined by the use of a bi-level dither matrix or dot pattern for each input grey level.

The dot patterns for each grey level may or may not be correlated.

This has the advantage that the halftone pattern for each grey level can be optimised while being less constrained by the halftone pattern for other grey levels than is the case with use of a single dither matrix for all grey levels.

Alternatively, the dot pattern for each grey level can be optimised without being constrained at all by the halftone patterns for other grey levels.

This provides an improvement in the halftone pattern achievable for a constant input grey level.

More generally, a further modification arises from the third embodiment where the output value of the current pixel is initially determined by the use of one of a set of dither matrices where the particular dither matrix used is selected as a function of the image input values in a local neighbourhood of the current pixel.

The above embodiments of the present invention have been described with reference to a monochrome output value of the display pixel, having an output value of the black or white colour values representative of a pixel being in the totally "off" or totally "on" state respectively. The described embodiments can readily be extended to display devices having a plurality of colour components per pixel and/or more than two output levels per colour component per pixel, wherein each colour component is halftoned independently.

In relation to the third embodiment, two particular notable extensions for colour component force field halftoning include the use of an "inverse" dither matrix, and the use of a "displaced" dither matrix. In particular, for a dither matrix D with dither values $d_{i,j}$ and a maximum dither value in D of MAXVAL, an "inverse" dither matrix can be defined as that with dither values:

$$d\_inverse_{i,j} = (MAXVAL - d_{i,j}).$$

Alternatively, for a dither matrix D with dither values $d_{i,j}$, a "displaced" dither matrix can be defined as that with dither values:

$$d\_displaced_{i,j} = d_{(i+offset\_x) modulo\ max\_x, (j+offset\_y) modulo\ max\_y}.$$

Two examples follow for the use of an "inverse" dither matrix and a "displaced" dither matrix for colour halftoning.

EXAMPLE 1

RGB Dither Matrix Halftoning

For RGB halftoning, given a dither matrix D with dither values $d_{i,j}$ and a maximum dither value in D of MAXVAL, a dither matrix for the green colour component DG with dither values $dg_{i,j} = d_{i,j}$ can be used. For the red and blue colour components, a single dither matrix DRB with dither values $drb_{i,j} = MAXVAL - d_{i,j}$ can be used.

EXAMPLE 2
CMYK Dither Matrix Halftoning

For CMYK halftoning, a dither matrix D with dither values $d_{i,j}$ and a maximum dither value in D of MAXVAL, a number of dither matrices can be used, in combination. Firstly, a dither matrix for the black (K) colour component DK with dither values $$dk_{i,j}=d_{(i+\text{offset}\_x) \text{modulo max}\_x, (j+\text{offset}\_y) \text{modulo max}\_y}$$

is applied. A dither matrix for the magenta colour component DM with dither values $dm_{i,j}=d_{i,j}$ and a dither matrix for the cyan and yellow colour components DCY with dither values $dcy_{i,j}=\text{MAXVAL}-d_{i,j}$ are also applied.

The above described embodiments can be practically implemented in software on a general purpose computer, the software being resident within the computer memory, including magnetic storage (eg. hard and/or floppy disks), optical disks (CD-ROM), volatile RAM, or accessible via a computer network, such as the Internet. In such instances, single images or image sequences can be halftoned and output directly to a multi-level display device (eg. a FLCD) associated with the general purpose computer.

Figure 14:
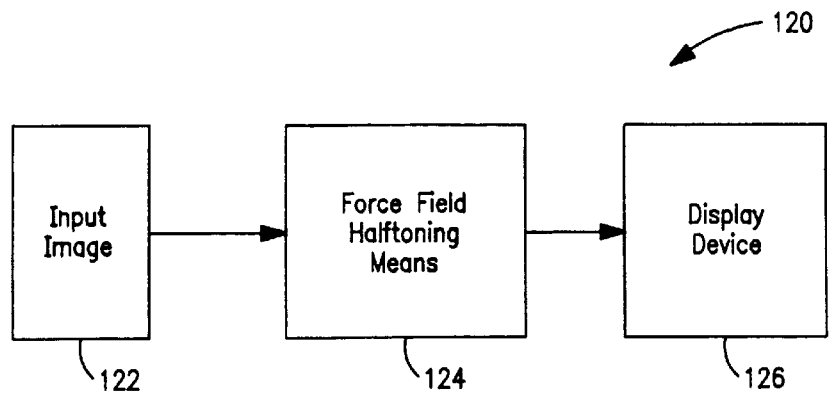
FIG. 14 depicts a generic hardware arrangement for performing the described embodiments.

FIG. 14 illustrates a display system 120 in which an image is displayed on a display device 126. The displayed image is sourced from an input image 122 that is supplied to a force field halftoning means 124 configured to operate in accordance with the present invention. The force field halftoning means 124 performs a halftoning operation on the input image so that a halftone output signal is provided to the display device 126. The display device 126 can be an electronic display such as a ferro-electric liquid crystal device, plasma device or other arrangement which has a generally limited number of display levels for which halftoning of an input image is desirable. Alternatively, the display device can be a printer or some other form of hard copy reproducing apparatus, again with a generally limited number of intensity levels.

Figure 15:
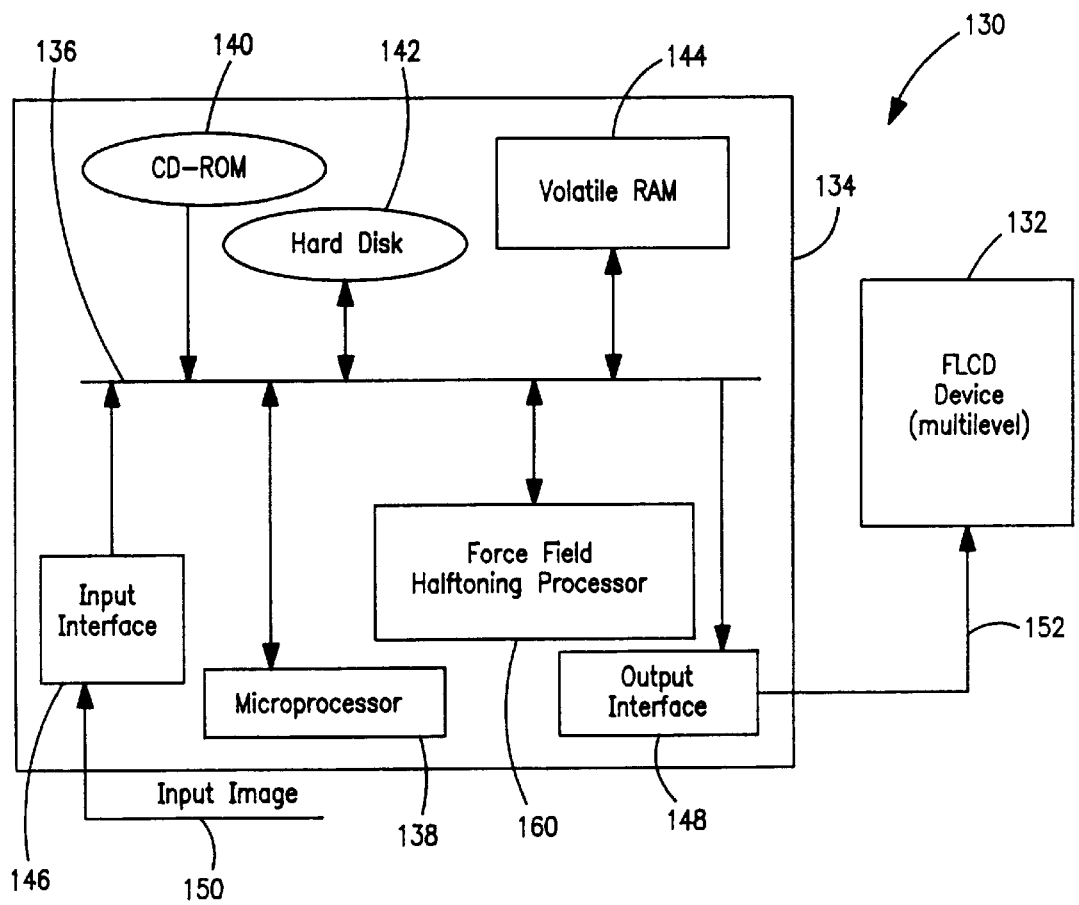
FIG. 15 depicts a computer system operable to perform force field halftoning according to the described embodiments.

A specific arrangement is illustrated in FIG. 15 which shows a computer system 130 including a computer 134 having an output connected to an FLCD device 132. The computer 134 includes a system bus 136 to which a controlling microprocessor 138 is connected. The computer 134 incorporates a non-volatile random access memory (RAM) in the form of a hard disk 142 and also volatile RAM 144 which is typically formed by semiconductor components. A read only memory (ROM) device, such as a compact disc device (CD-ROM) 140 also connects to the bus to provide a source of information and controlling programs. Coupled to the bus 136 is an input interface 146 via which an input image 150 can be provided to the computer 134. Also connected to the bus 136 is an output interface 148 which connects via a signal line 152 to the FLCD 132. In operation, either one of the CD-ROM 140 or hard disk 142 can incorporate a computer program configured to perform force field halftoning in accordance an embodiment of the present invention. The computer program is generally loaded from either one of the CD-ROM 140 or the hard disk 142 into the RAM 144 to enable running of the program. An image to be halftoned can be supplied via the input image line 150 or from either one of the CD-ROM 140 or the hard disk 142. The microprocessor 138 can, via the program, perform force field halftoning of the image. Depending upon the rate at which the computer program performs halftoning, the halftoned image can be stored in a frame memory, comprising for example part of the volatile RAM 144 and, once the entire image has been halftoned, the entire image can be transferred to the output interface 148 for display on the FLCD 132. Alternatively, where processing speed permits, the microprocessor 138 can perform force field halftoning and via the output interface directly output halftoned pixel values to the FLCD 132 whilst using the RAM 144 as intermediate storage for the various repulsive measures and the like used in force field halftone calculations described above.

An alternative arrangement is also seen in FIG. 15 where an optional force field halftoning processor 160 connects to the bus 136 and which, under control of the microprocessor 138, is configured to perform specific force field halftoning calculations and operations in hardware thus releasing the microprocessor 138 from complicated calculations and thus permitting it to perform other management operations necessary for the control of the system 130.

Appendix 1 and Appendix 2, the disclosure of which are incorporated herein, illustrate computer code written in C for a software implementation of two level (black and white) halftoning performed in accordance with the present invention. Appendix 1 in particular includes a map for pre-processing image input data used in the program listing specified in Appendix 2, the latter describing the specific implementation that can be performed in the computer 134.

Arrangements such as those shown in FIG. 15 can be useful in computing and other applications where the image update time is not crucial to system performance.

However, particularly for the display of image sequences, a software implementation of the present invention may not be sufficiently fast so as to achieve real-time image display (eg. 25 frames per second in the PAL colour system). Further, in some applications such as portable personal computers and the like, it is desirable that a practical implementation of the present invention be interchangeable with standard hardware used in such applications. Accordingly, incorporation of an embodiment of the invention into the discrete level display device is advantageous.

Figure 16:
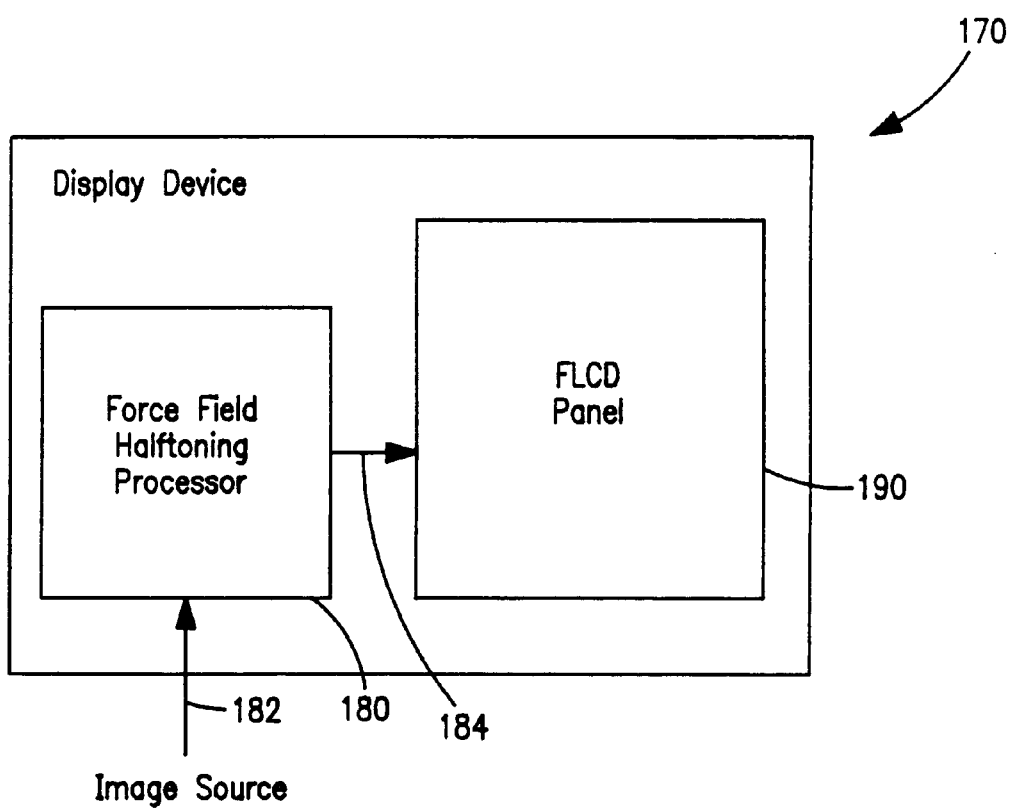
FIG. 16 depicts a display system operable according to the described embodiments.

FIG. 16 shows a display device 170 including an FLCD display panel 190 supplied with halftoned pixel data from a force field halftoning processor 180. The processor 180 is input with (substantially continuous tone) pixel data 182 derived from a suitable source of such data including a video device, such as a television receiver, or a general purpose computer, for example.

FIG. 17 illustrates an exemplary embodiment of a force field halftoning processor 200, the general configuration of which can be applied to a number of the embodiments described above. In FIG. 17, a stream of pixel input values 202 are supplied to a pixel result calculator 204. The calculator 204 provides a pixel halftone output value 206, representing a display output of the processor 200. The calculator 204 also outputs pixel excess values via a line 208 to a pixel result serial memory 210 and also to a left wedges calculator 212. The left wedges calculator 212 determines black and white left wedge excess values which are output 224 to a left wedges serial memory 226. The memory 226 includes a return line 228 to the left wedges calculator 212, and an output line 230 to the pixel result calculator 204. The pixel result serial memory 210 includes an output 213 that supplies an input to a right wedges calculator 214. The right wedges calculator 214 determines black and white right wedge excess values which are output 216 to a right wedges serial memory 218. The serial memory 218 includes two outputs, a first output 222 which supplies a further input of the right wedges calculator 219, and a second output 220 which supplies both a further input of the right wedges serial memory 218 and also a further input of the pixel result calculator 204.

Each of the memories 210, 226 and 218 incorporate a "direction" input which is supplied with a signal 232 representing the calculation direction being performed on the particular forward or reverse pass as noted above. When the signal 232 is a logical 1 (forward pass), the left wedges serial memory 226 shifts from left to right, and both the right wedges serial memory 218 and the pixel result serial memory 210 shift from left to right. When the signal 232 is a logical 0 (reverse pass), the left wedges serial memory 226 does not shift and both the right wedges serial memory 218 and the pixel result serial memory 210 shift from right to left.

Appendix 3, the disclosure of which is incorporated herein, indicates pseudo-code descriptive of the operation of FIG. 17, and refers to the various input and output signals that apply throughout the processor 200 and for each of the calculators 204, 212 and 214 in a specific monochrome halftoning process. The various calculations are consistent with the description above for the "wedges" embodiment, but alternatively can be modified to the apply to the "quadrant" embodiment described above.

The processor 200 is advantageous in that its structure permits receipt of a serial pixel stream as input and provides a corresponding pixel output stream in a form ready for display and in reliance only upon a controlling forward/reverse pass signal 232 in order to control the direction of halftoning. Further, because each of the calculators 204, 212 and 218 only perform additions and multiplications, such can be configured in silicon at gate level thereby permitting real-time operation and hence the display of image sequences without any noticeable delay due to the halftoning process.

The foregoing describes only a number of embodiments of the present invention, and modifications, obvious to those skilled in the art, can be made thereto without departing from the scope of the present invention.

APPENDIX 1

```
/*
inverse force field map for 2 level halftoning
static float fx = 3.0/8;
*/
float invFF_2v_3o8[256] =
{          51.660447,    79.954762,    104.000115,
0.000000,  51.999936,    80.039392,    104.277835,
1.000228,  53.999906,    80.663409,    105.000100,
1.000028,  55.999875,    80.999980,    105.524898,
2.000213,  55.999875,    80.999980,    106.000085,
4.001641,  57.301898,    83.563170,    106.138701,
6.229234,  58.999829,    89.999843,    106.988883,
8.468013,  60.999799,    89.999843,    107.672238,
10.000091, 61.549888,    90.999827,    108.000054,
13.000045, 61.999784,    92.317414,    108.812299,
15.541348, 62.815433,    92.317414,    109.000039,
18.047147, 62.999768,    92.341247,    109.103150,
20.385146, 62.999768,    92.396693,    109.620166,
22.395329, 66.000209,    92.999797,    110.987849,
23.999877, 71.013265,    92.999797,    111.818089,
27.781920, 71.863933,    92.999797,    111.999993,
27.781920, 72.972865,    96.375718,    112.920213,
30.361161, 73.000102,    96.657815,    113.471274,
32.000241, 73.000102,    96.867929,    114.556375,
34.365964, 73.248639,    97.793012,    114.856954,
36.899972, 74.000087,    98.514304,    114.999948,
38.000150, 74.371190,    99.695220,    115.778146,
43.000073, 75.056491,    99.942784,    115.999932,
43.000073, 75.964065,    100.000176,   116.619573,
43.932452, 76.000056,    100.417972,   117.119565,
45.899348, 77.067647,    101.000161,   117.570434,
46.000028, 77.797694,    101.601562,   117.999902,
46.466947, 78.474240,    102.015710,   118.469253,
47.000012, 79.000010,    103.000131,   118.999887,
```

APPENDIX 1-continued

```
49.647832,   79.590468,    103.206353,   118.999887,
119.174981,  145.350652,   165.000157,   201.000094,
119.320407,  145.813193,   165.000157,   202.675166,
119.325271,  145.999961,   170.000081,   203.339553,
120.999856,  146.181378,   174.000020,   205.076394,
120.999856,  146.999946,   174.000020,   208.200860,
121.816478,  147.354512,   174.249530,   208.553481,
121.816478,  148.109365,   174.961581,   208.999972,
121.838851,  148.898263,   175.046210,   209.100652,
121.838851,  148.999915,   175.419745,   211.057820,
133.161149,  149.413819,   175.999990,   211.999927,
133.161149,  149.999900,   176.247554,   211.999927,
133.183522,  150.547071,   177.013593,   216.999850,
133.183522,  150.997939,   177.934299,   218.125319,
134.000144,  151.934695,   178.285460,   220.569835,
134.018626,  152.011542,   178.999944,   223.073688,
135.674729,  152.898688,   179.910922,   244.000230,
135.674729,  153.398438,   180.133681,   227.218080,
135.855174,  153.999839,   180.999913,   228.308530,
136.000113,  154.643798,   181.521792,   231.000123,
136.014218,  154.999824,   181.999898,   232.771497,
136.780744,  155.051866,   181.999898,   234.612908,
137.000098,  155.295053,   182.027135,   237.034078,
137.452912,  157.513404,   183.136067,   239.931893,
138.000083,  157.635970,   183.986735,   241.999955,
138.329844,  157.895207,   188.999791,   244.999909,
138.993754,  158.330512,   192.000232,   245.999894,
139.281678,  158.654923,   192.000232,   248.999848,
140.000052,  159.823680,   192.205968,   251.079097,
140.143046,  161.000218,   192.942338,   252.999787,
140.443625,  161.000218,   193.401961,   253.999772,
141.528726,  161.000218,   194.068294,   253.999772,
142.314219,  161.019673,   196.000171,   255.000000,
143.000007,  161.200118,   197.698102,   };
143.124032,  163.000188,   199.000125,
144.055438,  164.000173,   199.000125,
```

APPENDIX 2

```
/*
*source code for 2 level halftoning
*/
void
ff_pixel_2level
(
    int16,    **from_plane,
    int16,    **to_plane,
    int       y_max,
    int       x_max
)
{
    intg;    /*grey level 0 <= g <= 255*/
    float Fminusth[256];
    float Fplusth[256];
#ifdef FF_CC_DITH
    static double fth = 0.0005;
#endif
    static double fx = 3.018;
    static double fy = 3.018;
    static double fz = 0.249798163;
    static double fxz = 0.093674311;
    static double fyz = 0.093674311;
    int x,y,to_val;
    int dither_val;
    int ifrom_val;
    double from_val;
    double from_xb, from_xw;
    double s_xb; s_xw;
    double force_diff;
    double force_minus_th;
    double force_plus_th;
    double xb, xw;
    double xbll;
    double xwll;
    double xbul;
    double xwul;
```

APPENDIX 2-continued

```
    double xblr;
    double xwlr;
    double xbur;
    double xwur;
    double xb_in, xw_in;
    double e_out;
    double **xbll_plane;
    double **xwll_plane;
    double **xbul_plane;
    double **xwul_plane;
    double **xbur_plane;
    double **xwlr_plane;
    double **xbur_plane;
    double **xwur_plane;
    double **e_plane;
    xbll_plane = (double **) malloc(y_max * sizeof(double *));
    xwll_plane = (double **) malloc(y_max * sizeof(double *));
    xbul_plane = (double **) malloc(y_max * sizeof(double *));
    xwul_plane = (double **) malloc(y_max * sizeof(double *));
    xblr_plane = (double **) malloc(y_max * sizeof(double *));
    xwlr_plane = (double **) malloc(y_max * sizeof(double *));
    xbur_plane = (double **) malloc(y_max * sizeof(double *));
    xwur_plane = (double **) malloc(y_max * sizeof(double *));
    e_plane = (double **) malloc(y_max * sizeof(double *);
    for (y = 0; y < y_max; y++)
    {
        xbll_plane[y] = (double *) malloc(x_max * sizeof(double));
        xwll_plane[y] = (double *) malloc(x_max * sizeof(double));
        xbul_plane[y] = (double *) malloc(x_max * sizeof(double));
        xwul_plane[y] = (double *) malloc(x_max * sizeof(double));
        xblr_plane[y] = (double *) malloc(x_max * sizeof(double));
        xwlr_plane[y] = (double *) malloc(x_max * sizeof(double));
        xbur_plane[y] = (double *) malloc(x_max * sizeof(double));
        xwur_plane[y] = (double *) malloc(x_max * sizeof(double));
        e_plane[y] = (double *) malloc(x_max * sizeof(double));
    }
#ifdef FF_CC_DITH
    Fminusth[0] = 0;
    Fplusth[0] = 0;
    for (g = 1; g <255; g++)
    {
        Fminusth[g] = -fth/g;
        Fplusth[g] = fth/(255 - g);
    }
#endif
    for(y=0;y<y_max;++y)
    for(x=0;x<x_max;++x)
    {
        xbll_plane[y][x] = 0;
        xwll_plane[y][x] = 0;
        xbul_plane[y][x] = 0;
        xwul_plane[y][x] = 0;
        xblr_plane[y][x] = 0;
        xwlr_plane[y][x] = 0;
        xbur_plane[y][x] = 0;
        xwur_plane[y][x] = 0;
        e_plane[y]]x] = 0;
    }
    for(y=0;y<y_max;++y)
    {
        for(x=0;x<x_max;++x)
        {
            ifrom_val = from_plane[y][x];
            from_val = from_plane[y][x];
            xbll = 0;
            xwll = 0;
            xbul = 0;
            xwul = 0;
            xblr = 0;
            xwlr = 0;
            xbur = 0;
            xwur = 0;
            xbln = 0;
            xwln
            if (x > 0)
            {
                xb = fx* xbll_plane[y][x - 1];
                xbll += xb;
                xw = fx xwll_plane[y][x - 1];
                xwll += xw;
                xb_in += xb;
                xw_in += xw;
            }
            if(y >0)
            }
                if (x > 1)
                {
                    xbll -= fxz *xbll_plane[y - 1][x - 2];
                    xwll -= fxz *xwll_plane[y - 1][x - 2],
                }
                if(x > 0)
                {
                    xbll += fz*xbll_plane[y - 1][x - 1];
                    xwll += fz*xwll_plane[y - 1][x - 1];
                    xb = fz*xbul_plane[y - 1][x - 1];
                    xbul += xb;
                    xw = fz*xwul_plane[y - 1][x - 1];
                    xwul += xw;
                    xbln += xb;
                    xwln += xw;
                }
                xbul += fy*xbul_plane[y - 1][x];
                xwul += fy*xwul_plane[y - 1][x];
                xb_in += fy*xbur_plane[y - 1][x];
                xw_in += fy*xwur_plane[y - 1][x];
                if( x < x_max - 1)
                {
                    xb_in += fz*xblr_plane[y - 1][x + 1];
                    xw_in += fz*xwlr_plane[y - 1][x + 1];
                }
            }
            if(y > 1)
            {
                if(x > 0)
                {
                    xbul -= fyz*xbul_plane[y - 2][x - 1];
                    xwul -= fyz*xwul_plane[y - 2][x - 1];
                }
            }
            from_val = invFF_2v_3o8[(int) from_val];
            from_xb = from_val;
            from_xw = 255 - from_val;
            if (from_xb > 0)
            {
                s_xb = (float)1/(255 - from_xb);
            }
            else
            {
                s_xb = 0;
            }
            if(from_xw > 0)
            {
                s_xw = (float)1/(255 - from_xw);
            }
            else
            {
                s_xw = 0;
            }
            force_diff = xb_in * s_xb - xw_in * s_xw;
#ifdef FF_CC_DITH
            force_minus_th = Fminusth[ifrom_val];
            force_plus_th = Fplusth[ifrom_val];
            if (force_minus_th <= force_diff &&
                force_diff << force_plus_th)
            {
                dither_val = dither_cell[y%(64)][(x%(64)];
#define FF_DITH_COLOR
#ifdef FF_DITH_COLOR
                if(plane == 1)/*green*/
                {
                    dither_val = 254-dither_val;
                }
#endif
                if (from_val > dither_val;
                {
                    to_val = 255;
                }
                else
```

APPENDIX 2-continued

```
        {
            to_val = 0;
        }
    }
    else if (force_diff >= 0)
#else
    if (force_diff >= 0)
#endif
    {
        to_val = 255;
    }
    else
    {
        to_val = 0;
    }
    to_plane[y][x] = to_val;
    e_out = from_val - to_val;
    if(e_out > 0)
    {
        e_out = (float)1/(255 - e_out);
    }
    else if (e_out < 0)
    {
        e_out = - (float)1/(255 + e_out);
    }
    e_plane[y][x] = e_out;
    if (e_out > 0)
    {
        xbll += e_out;
        xbul += e_out;
    }
    else
    {
        xwll -= e_out;
        xwul -= e_out;
    }
    xbll_plane[y][x] = xbll;
    xwll_plane[y][x] = xwll;
    xbul_plane[y][x] = xbul;
    xwul_plane[y][x] = xwul;
}
for(x = x_max - 1;x>=0;--x)
{
    e_out = e_plane[y][x];
    if(e_out > 0)
    {
        xblr = e_out;
        xwlr = 0;
        xbur = e_out;
        xwur = 0;
    }
    else
    {
        xblr = 0;
        xwlr = -e_out;
        xbur = 0;
        xwur = -e_out;
    }
    if(x < x_max - 1)
    {
        xblr += fx*xblr_plane[y][x + 1];
        xwlr += fx*xwlr_plane[y][x + 1];
    }
    if(y > 0)
    {
        if(x < x_max - 2)
        {
            xblr -= fxz*xblr_plane[y - 1][x + 2];
            xwlr -= fxz*xwlr_plane[y - 1][x + 2];
        }
        if(x < x_max - 1)
        {
            xblr += fz*xblr_plane[y - 1][x + 1];
            xwlr += fz*xwlr_plane[y - 1][x + 1];
            xbur += fz*xbur_plane[y - 1][x + 1];
            xwur += fz*xwur_plane[y - 1][x + 1];
        }
        xbur += fy*xbur_plane[y - 1][x];
        xwur += fy*xwur_plane[y - 1][x];
```

APPENDIX 2-continued

```
    }
    if(y > 1)
    {
        if(x < x_max - 1)
        {
            xbur -= fyz*xbur_plane[y - 2][x + 1];
            xwur -= fyz*xwur_plane[y - 2][x + 1];
        }
    }
    xblr_plane[y][x] = xblr;
    xwlr_plane[y][x] = xwlr;
    xbur_plane[y][x] = xbur;
    xwur_plane[y][x] = xwur;
    }
}
for (y = 0; y < y_max; y++)
{
    free(xbll_plane[y]);
    free(xwll_plane[y]);
    free(xbul_plane[y]);
    free(xwul_plane[y]);
    free(xblr_plane[y]);
    free(xwlr_plane[y]);
    free(xbur_plane[y]);
    free(xwur_plane[y]);
    free(e_plane[y]);
}
free(xbll_plane);
free(xwll_plane);
free(xbul_plane);
free(xwul_plane);
free(xblr_plane);
free(xwlr_plane);
free(xbur_plane);
free(xwur_plane);
free(e_plane);
}
```

APPENDIX 3

Pixel Calculator
    Pixel calculator input:
        /* pixel input value */
        i[x][y]
        /* left wedge values */
        WBbl[x−1][y], WBtl[x−1][y−1]
        WWbl[x−1][y], WWtl[x−1][y−1]
        /* right wedge values */
        WBtr[x][y−1], WBbr[x+1][y−1]
        WWtr[x][y−1], WWbr[x+1][y−1]
    Pixel calculator output:
        /* pixel halftone output value */
        o[x][y]
        /* pixel excess black value */
        b[x][y]
        /* pixel excess white value */
        w[x][y]
    Pixel calculator pseudo-code description:
        b = i[x][y]
        w = 255 − i[x][y]
        Fb = Fleft * WBbl[x−1][y]
            + Ftop_left * WBtl[x−1][y−1]
            + Ftop * WBtr[x][y−1]
            + Ftop_right * WBbr[x+1][y−1]
        Fb = Fb * b
        Fw = Fleft * WWbl[x−1][y]
            + Ftop_left * WWtl[x−1][y−1]
            + Ftop * WWtr[x][y−1]
            + Ftop_right * WWbr[x+1][y−1]
        Fw = Fw * w
        if (Fb >= Fw)
        }
            o[x][y] = 255
            b[x][y] = 0
            w[x][y] = w
        }

APPENDIX 3-continued

```
        else
        {
                o[x][y] = 0
                b[x][y] = b
                w[x][y] = 0
        }
Left wedges calculator
        Left wedges calculator input:
                /* pixel excess black value */
                b[x][y]
                /* pixel excess white value */
                w[x][y]
                /* left wedge excess black values */
                WBbl[x-1][y], WBbl[x-1][y-1], WBbl[x-2][y-1]
                WBtl[x-1][y-1], WBtl[x][y-1], WBtl[x-1][y-2]
                /* left wedge excess white values */
                WWbl[x-1][y], WWbl[x-1][y-1), WWbl[x-2][y-1]
                WWtl[x-1][y-1], WWtl[x][y-1], WWtl[x-1][y-2]
        Left wedges calculator output:
                /* left wedge excess black values */
                WBbl[x][y], WBtl[x][y]
                /* left wedge excess white values */
                WWbl[x][y], WWtl[x][y]
        Left wedges calculator pseudo-code description;
                WBbl[x][y] = b[x][y] + Fleft * WBbl[x-1][y]
                        + Ftop_left * WBbl[x-1][y-1]
                        - Fleft * top_left * WBbl[x-2][y-1]
                WBtl[x][y] = b[x][y]
                        + Ftop_left * WBtl[x-1][y-1]
                        + Ftop * WBtl[x][y-1]
                        - Ftop_left * Ftop * WBtl[x-1][y-2]
                WWbl[x][y] = w[x][y] + Fleft * WWbl[x-1][y]
                        + Ftop_left * WWbl[x-1][y-1]
                        - Fleft * top_left * WWbl[x-2][y-1]
                WWtl[x][y] = w[x][y]
                        + Ftop_left * WWtl[x-1][y-1]
                        + Ftop * WWtl[x][y-1]
                        - Ftop_left * Ftop * WWtl[x-1][y-2]
Right wedges calculator
        Right wedges calculator input:
                /* pixel excess black value */
                b[x][y]
                /* pixel excess white value */
                w[x][y]
                /* right wedge excess black values */
                WBtr[x][y-1], WBtr[x+1][y-1], WBtr[x+1][y-2]
                WBbr[x+1][y-1], WBbr[x+1][y], WBbr[x+2][y-1]
                /* right wedge excess white values */
                WWtr[x][y-1], WWtr[x+1][y-1], WWtr[x+1)[y-2]
                WWbr[x+1][y-1], WWbr[x+1][y], WWbr[x+2][y-1]
        Right wedges calculator output:
                /* right wedge excess black values */
                WBtr[x][y], WBbr[x][y]
                /* right wedge excess white values */
                WWtr[x][y], WWbr[x][y]
        Right wedges calculator pseudo-code description:
                WBtr[x][y] = b[x][y] + Ftop * WBtr[x][y-1]
                        + Ftop_right * WBtr[x+1][y-1]
                        - Ftop * Ftop_right * WBtr[x+1][y-2]
                WBbr[x][y] = b[x][y]
                        + Ftop_right * WBbr[x+1][y-1]
                        + Fright * WBbr[x+1][y]
                        - Ftop_right * Fright * WBbr[x+2][y-1]
                WWtr[x][y] = w[x][y] + Ftop * WWtr[x][y-1]
                        + Ftop_right * WWtr[x+1][y-1]
                        -Ftop * Ftop_right * WWtr[x+1][y-2]
                WWbr[x][y] = w[x][y]
                        + Ftop_right * WWbr[x+1][y-1]
                        + Fright * WWbr[x+1][y]
                        - Ftop_right * Fright * WWbr[x+2][y-1]
```

What is claimed is:

1. A method of halftoning an image, said image comprising a plurality of pixels each having an input value and an assignable output value that can take on one of at least two output values, said method comprising, for a current pixel of said image, the steps of:

(a) determining an under result and an over result for the current pixel and for a plurality of previously halftoned pixels of said image, wherein said under result and said over result for a pixel are dependent upon an output value assigned to that pixel;

(b) determining using the under result and the over result for the current pixel and for the plurality of previously halftoned pixels, an under result repulsive measure and an over result repulsive measure for the current pixel, whereby said under result repulsive measure is dependent upon a sum, over the plurality of previously halftoned pixels, of a product of the under result for the current pixel and the under result for a previously halftoned pixel, and whereby said over result repulsive measure is dependent upon a sum, over the plurality of previously halftoned pixels, of a product of the over result for the current pixel and the over result for a previously halftoned pixel;

(c) comparing the under result repulsive measure to the over result repulsive measure; and (d) assigning a first output value as the output value for the current pixel in the event that the under result repulsive measure is greater than the over result repulsive measure, and assigning a second output value as the output value for said current pixel in the event that the over result repulsive measure is greater than the under result repulsive measure.

2. A method as claimed in claim 1, wherein the under result is determined by assigning to it a value of zero if the output value of the pixel is greater than or equal to the input value and assigned a value equal to the input value less the output value if the output value of the pixel is less than the input value, and wherein the over result is determined by assigning to it a value of zero if the output value is less than or equal to the input value and assigned a value equal to the output value less the input value if the output of the current pixel is greater than the input value.

3. A method as claimed in claim 2, wherein the under and over results are determined using an error measure between the output value and the input value that preserves a ratio of error between the under result and the over result.

4. A method as claimed in claim 1 or 2, wherein the first output state value is the least output state value which is greater than or equal to the input value of the current pixel, and said second output state value is the greatest output state value which is less than or equal to the input value of the current pixel.

5. A method as claimed in claim 1 or 2, wherein the under result repulsive measure is determined from the under result of at least one of the previously halftoned pixels and an under result for the current pixel when the current pixel is halftoned to the second output (state) value, and the over result repulsive measure is determined from the over result of at least one of the previously halftoned pixels and an over result for the current pixel when the current pixel is halftoned to the first output value.

6. A method as claimed in claim 1, wherein said image is any one image of a series of images.

7. A method as claimed in claim 1, wherein the under result repulsive measure and over result repulsive measure are determined utilizing a set of geometrically reducing weight values.

8. A method as claimed in claim 1, wherein the under result and the over result are each determined for each previously halftoned pixel of said image.

9. A method as claimed in claim 1, wherein said pixels are halftoned in raster-display order and said previously halftoned pixels are divided into at least two groups and step (b) comprises determining repulsive measures for each of said groups, said repulsive measures being summed prior to step (c).

10. A method as claimed in claim 1, of wherein said image comprises (y) scanlines and (x) pixels per scanline, and said current pixel has a location (i,j) (where $1 \leq i \leq x$, $1 \leq j \leq y$) in said image, and said previously halftoned pixels are divided into two groups, a first one of said groups being bounded by pixels at locations (1,1), (i−j,1) (1,j) and (i−1, j), and the second one of said groups being bounded by pixels at locations (i,1), (x,1), (i,j−1) and (x,j−1).

11. A method as claimed in claim 10, wherein each of said groups is divided into a plurality of subgroups each extending substantially radially from said current pixel, said repulsive measures being determined for each of said sub-groups.

12. A method as claimed in claim 10, wherein pixels in a current scanline of said image are halftoned by at least one forward pass proceeding in the raster scan direction, and at least one reverse pass proceeding in a reverse raster scan direction, the forward pass determining the contribution to the repulsive measures of pixels in the current scanline by the first one of said groups, and the reverse passes determining the contribution to the repulsive measures of pixels in the next scanline by the second one of said groups.

13. A method as claimed in claim 10, wherein pixels in a current scanline of said image are halftoned by at least one pass proceeding either left to right or right to left but in the opposite direction to a pass of the previous scanline.

14. A method as claimed in claim 1, further comprising, before step (a), the step of:

(aa) preprocessing said current pixel using an inverse transform to correct for non-linearity in the halftoning method.

15. A method as claimed in claim 1, wherein said pixel has more than one colour component.

16. A method of halftoning one or more images, each image comprising pixels, said method comprising, for a current pixel of a current image, the steps of:

(a) assigning a predetermined value to an output value of the current pixel;

(b) determining an under result and an over result for the current pixel and for a plurality of previously halftoned pixels of said image, whereby said under result and said over result for a pixel are dependent upon an output value assigned to that pixel;

(c) determining a repulsive measure between the current pixel and a plurality of previously halftoned pixels of the current image whereby said repulsive measure is one of an under result repulsive measure and an over result repulsive measure, and whereby said under result repulsive measure is dependent upon a sum, over the plurality of previously halftoned pixels, of a product of the under result for the current pixel and the under result for a previously halftoned pixel, and whereby said over result repulsive measure is dependent upon a sum, over the plurality of previously halftoned pixels, of a product of the over result for the current pixel and the over result for a previously halftoned pixel;

(d) comparing the repulsive measure to a minimum repulsive measure achievable for the current pixel in combination with a threshold value; and (e) retaining the predetermined value as the output value of said pixel if the repulsive measure is less than a sum of the minimum repulsive measure and the threshold value.

17. A method as claimed in claim 16, wherein the predetermined value is assigned a value equal to the output value of a corresponding pixel of a previous frame.

18. A method as claimed in claim 17, wherein the predetermined value is assigned a value equal to an output value to said pixel determined by a process of dithering an input value of said pixel.

19. A method as claimed in claim 16, wherein said dithering is performed using one of an inverse dither matrix or a displaced dither matrix.

20. A method as claimed in claim 16, wherein the predetermined value is assigned a value equal to an output value of said pixel determined by selection from a dot pattern indexed by the pixel input value.

21. A method as claimed in claim 20, wherein said dot patterns are at least partly uncorrelated.

22. A method as claimed in claim 21, wherein said input dot pattern is optimized by simulated annealing.

23. A method as claimed in claim 16, wherein the predetermined value is determined by another halftoning process.

24. A method as claimed in claim 16, wherein the predetermined value is assigned a value equal to an output value of said pixel determined by a process of dithering an input value of said pixel, and wherein the dither matrix used for dithering is selected from a set of dither matrices using a function of the nearby pixel input values.

25. A method as claimed in claim 24, wherein said function comprises including but not limited to indexing a dither matrix by the pixel input value.

26. A method as claimed in claim 16, wherein said minimum repulsive measure is an over repulsive measure in the event that the predetermined value is less than an input value of the pixel.

27. A method as claimed in claim 16, wherein said minimum repulsive measure is an under repulsive measure in the event that the predetermined value is greater than an input value of the pixel.

28. Apparatus for halftoning a current pixel of an image, said image comprising a plurality pixels each having an input value and an assignable output value that can take on one of at least two output values, said apparatus comprising:

first means for determining an under result and an over result for a plurality of previously halftoned pixels of said image, whereby said under result and said over result for a pixel are dependent upon an output value assigned to that pixel;

second means for determining, using the under results and the over results, an under result repulsive measure and an over result repulsive measure for the current pixel, whereby said under result repulsive measure is dependent upon a sum, over the plurality of previously halftoned pixels, of a product of the under result for the current pixel and the under result for a previously halftoned pixel, and whereby said over result repulsive measure is dependent upon a sum, over the plurality of previously halftoned pixels, of a product of the over result for the current pixel and the over result for a previously halftoned pixel;

means for comparing the under result repulsive measure; and means for assigning a first output value as the output value for the current pixel in the event that the under result repulsive measure is greater than the over result repulsive measure, and assigning a second output value as the output value for said current pixel in the event that the over result repulsive measure is greater than the under result repulsive measure.

29. Apparatus as claimed in claim 28, wherein said first means for determining determines the under result by assigning to the under result a value of zero if the output value of said current pixel is greater than or equal to the input value, and assigning a value equal to the input value less the output value if the output value of said current pixel is less than the input value, and wherein first means for determining determines the over result by assigning to the over result a value of zero if the output value is less than or equal to the input value and assigning a value equal to the output value less the input value if the output of the current pixel is greater than the input value.

30. Apparatus as claimed in claim 28, wherein the first output state value is the least output state value which is greater than or equal to the input value of the current pixel, and said second output state value is the greatest output state value which is less than or equal to the input value of the current pixel.

31. Apparatus as claimed in claim 28, wherein the under result repulsive measure is determined from the under result of at least one of the previously halftoned pixels and an under result for the current pixel assuming the current pixel is to be halftoned to the second output value, and wherein the over result repulsive measure is determined from the over result of at least one of the previously halftoned pixels and an over result for the current pixel assuming the current pixel is to be halftoned to the first output value.

32. Apparatus as claimed in claim 28, wherein said image is any one image of a series of images.

33. Apparatus as claimed in claim 28, wherein the under result repulsive measure and over result repulsive measure are determined utilizing an set of geometrically reducing weight values.

34. Apparatus for halftoning one or more images, each image comprising pixels, said apparatus comprising:

means for assigning a predetermined value to an output value of a current pixel;

means for determining an under result and an over result for the current pixel and for a plurality of previously halftoned pixels of said image, wherein said under result and said over result for a pixel are dependent upon an output value assigned to that pixel;

means for determining a repulsive measure between the current pixel and a plurality of previously halftoned pixels of the current image wherein said repulsive measure is one of an under result repulsive measure and an over result repulsive measure, and wherein said under result repulsive measure is dependent upon a sum, over the plurality of previously halftoned pixels, of a product of the under result for the current pixel and the under result for a previously halftoned pixel, and wherein said over result repulsive measure is dependent upon a sum, over the plurality of previously halftoned pixels, of a product of the over result for the current pixel and the over result for a previously halftoned pixel;

means for comparing the repulsive measure to a minimum repulsive measure achievable for the pixel in combination with a threshold value; and means for retaining the value as the output value of said current pixel if the repulsive measure is less than a sum of the minimum repulsive measure and the predetermined threshold value.

35. Apparatus as claimed in claim 34, wherein the predetermined value is assigned a value equal to the output value of a corresponding pixel of a previous frame.

36. Apparatus as claimed in claim 34, wherein the predetermined value is assigned a value equal to an output value to said pixel determined by a process of dithering an input value of said pixel.

37. Apparatus as claimed in claim 34, wherein said minimum repulsive measure is an over repulsive measure in the event that the predetermined value is less than an input value of the pixel.

38. Apparatus as claimed in claim 34, wherein said minimum repulsive measure is an under repulsive measure in the event that the predetermined value is greater than an input value of the pixel.

39. Apparatus as claimed in 34, wherein said pixel has more than one colour component.

40. A computer software system for executing instructions on a general purpose computer, wherein said instructions comprise a plurality of process modules for halftoning an image, said image comprising a plurality of pixels each having an input value and an assignable output value that can take on one of at least two output values, said modules comprising:

a first determining module for determining an under result and an over result for a current pixel and for a plurality of previously halftoned pixels of said image, wherein said under result and said over result for a pixel are dependent upon an output value assigned to that pixel;

a second determining module for determining using the under results and the over results an under result repulsive measure and an over result repulsive measure for the current pixel, wherein said under result repulsive measure is dependent upon a sum, over the plurality of previously halftoned pixels, of a product of the under result for the current pixel and the under result for a previously halftoned pixel, and whereby said over result repulsive measure is dependent upon a sum, over the plurality of previously halftoned pixels, of a product of the over result for the current pixel and the over result for a previously halftoned pixel;

a comparing module for comparing the under result repulsive measure to the over result repulsive measure; and an assigning module for assigning a first output value as the output value for the current pixel in the event that the under result repulsive measure is greater than the over result repulsive measure, and assigning a second output value as the output value for said current pixel in the event that the over result repulsive measure is greater than the under repulsive measure.

41. A system as claimed in claim 40, wherein said instructions are configured for operation via a computer readable medium, said medium being one of a memory device, a computer, and a computer network.

42. A computer software system for executing instructions on a general purpose computer, wherein said instructions comprise a plurality of process modules for halftoning a series of images, each image comprising a plurality of pixels, said modules comprising:

an assigning module for assigning a predetermined value to an output value of the current pixel, a determining module for determining a repulsive measure between the current pixel and a plurality of previously halftoned pixels of the current image, wherein said repulsive measure is one of an under result repulsive measure and an over result repulsive measure, and wherein said under result repulsive measure is dependent upon a sum, over the plurality of previously halftoned pixels, of a product of the under result for the current pixel and the under result for a previously halftoned pixel, and whereby said over result repulsive measure is dependent upon a sum, over the plurality of previously halftoned pixels, of a product of the over result for the current pixel and the over result for a previously halftoned pixel;

a comparing module for comparing the repulsive measure to a minimum repulsive measure in combination with a threshold value; and a decision module for retaining the predetermined value as the output value of said pixel if the repulsive measure is less than a sum of the minimum repulsive measure and a threshold value.

43. A system as claimed in claim 42, wherein said instructions are configured for operation via a computer readable medium, said medium being one of a memory device, a computer, and a computer network.

44. A computer system comprising:

input means for receiving an image or a sequence of images;

halftoning means for halftoning said image(s), said halftoning being characterized by a determination of relative repulsive forces between a current pixel of the image(s) being halftoned, and a plurality of previous pixels of the image(s) that have been halftoned, wherein said relative repulsive forces are an under result repulsive measure and an over result repulsive measure, wherein said under result repulsive measure is dependent upon a sum, over the plurality of previously halftoned pixels, of a product of an under result for the current pixel and an under result for a previously halftoned pixel, and whereby said over result repulsive measure is dependent upon a sum, over the plurality of previously halftoned pixels, of a product of an over result for the current pixel and an over result for a previously halftoned pixel; and a discrete level display for displaying the image(s) output from said halftoning means.

45. A method of halftoning an image, said image comprising a plurality of pixels, said method being characterized by the determination of repulsive forces between a current pixel of the image being halftoned, and a plurality of previous pixels of the image that have been halftoned, wherein said repulsive forces are one of an under result repulsive measure and an over result repulsive measure, and wherein said under result repulsive measure is dependent upon a sum, over the plurality of previously halftoned pixels, of a product of an under result for the current pixel and an under result for a previously halftoned pixel, and whereby said over result repulsive measure is dependent upon a sum, over the plurality of previously halftoned pixels, of a product of an over result for the current pixel and an over result for a previously halftoned pixel.

46. A method as claimed in claim 45, wherein image is halftoned on a pixel-by-pixel basis in raster display order and said plurality of previous pixels comprises all previous pixels of the image.

47. An image processor comprising:

input means for receiving pixel data of an image to be displayed;

means for determining repulsive measure data from repulsive forces between said pixel data and a plurality of previously halftoned pixels, wherein said repulsive forces are one of an under result repulsive measure and an over result repulsive measure, and wherein said under result repulsive measure is dependent upon a sum, over the plurality of previously halftoned pixels, of a product of an under result for the current pixel and an under result for a previously halftoned pixel, and whereby said over result repulsive measure is dependent upon a sum, over the plurality of previously halftoned pixels, of a product of an over result for the current pixel and an over result for a previously halftoned pixel; and pixel calculator means for determining halftone output data of said image processor from said pixel data and said repulsive measure data.

48. An image processor as claimed in claim 47, wherein said pixel calculator means determines pixel excess values for a current pixel of said image, and said means for determining comprises;

first pixel group calculator means for determining first pixel group excess values from said pixel excess values and previously calculated first pixel group excess values;

first group memory means for storing said first pixel group excess values and supplying said previously calculated first pixel group excess values to said first pixel group calculator means and to said pixel calculator means;

a pixel result memory means for storing said pixel excess values;

second pixel group calculator means for determining second pixel group excess values from said pixel excess values output from said pixel result memory means and from previously calculated second pixel group excess values; and second group memory means for storing said second group excess values and supplying said previously calculated second group excess values to said second pixel group calculator means and to said pixel calculator means, said previously determined first group and second group excess values collectively comprising said repulsive measure data.

49. An image processor as claimed in claim 48, wherein said pixel result memory means, said first group memory means and said second group memory means each comprise serial memory.

50. An image processor as claimed in claim 49, wherein each said serial memory is operable to alter a direction of data movement therethrough.

51. An image processor as claimed in claim 50, wherein said pixel groups comprise respective portions of all previously halftoned pixels in said image.

52. An image processor as claimed in claim 49 wherein said pixel groups comprises left and right wedges of said previously halftoned pixels and, for a current pixel i[x][y] of said image:

inputs of said pixel calculator means comprise said current pixel i[x][y], left wedge excess values WBbl[x−1][y], WBtl[x−1][y−1], WWbl[x−1][y], and WWtl[x−1][y−1] output from the first group memory means, right wedge excess values WBtr[x][y−1], WBbr[x+1][y−1], WWtr[x][y−1], and WWbr[x+1][y−1] output from the second group memory means, said pixel calculator means outputs a pixel halftone output value o[x][y] pixel excess black value b[x][y], and a pixel excess white value w[x][y] determined by:

b=i[x][y];
w=255−i[x][y];

Fb=Fleft*WBbl[x−1][y]+Ftop_left*WBtl[x−1][y−1]+Ftop*WBtr[x][y−1]+Ftop_right*WBbr[x+1][y−1];
Fb=Fb*b;
Fw=Fleft*WWbl[x−1][y]+Ftop_left*WWtl[x−1][y−1]+Ftop*WWtr[x][y−1]+Ftop_right*WWbr[x+1][y−1];
Fw=Fw*w;
if (Fb>=Fw) then (o[x][y]=255, b[x][y]=0 and w[x][y]=w) or (o[x][y]=0, b[x][y]=b and w[x][y]=0);

inputs of the first (left) pixel group calculator means comprise the pixel excess black value b[x][y], the pixel excess white value w[x][y] both output from the pixel calculator means, and both left wedge excess black values WBbl[x−1][y], WBbl[x−1][y−1], WBbl[x−2][y−1], WBtl[x−1][y−1], WBtl[x][y−1], and WBtl[x−1][y−2] and left wedge excess white values WWbl[x−1][y], WWbl[x−1][y−1], WWbl[x−2][y−1], WWtl[x−1][y−1], WWtl[x][y−1], and WWtl[x−1][y−2] output from said first group memory means, and output of said first pixel group calculator means comprise left wedge excess black values WBbl[x][y] and WBtl[x][y], and left wedge excess white values WWbl[x][y] and WWtl[x][y], given by:

WBbl[x][y]=b[x][y]+Fleft*WBbl[x−1][y]+Ftop_left*WBbl[x−1][y−1]−Fleft*top_left*WBbl[x−2][y−1];

WBtl[x][y]=b[x][y]+Ftop_left*WBtl[x−1][y−1]+Ftop*WBtl[x][y−1]−Ftop_left*Ftop*WBtl[x−1][y−2];

WWbl[x][y]=w[x][y]+Fleft*WWbl[x−1][y]+Ftop_left*WWbl[x−1][y−1]−Fleft*top_left*WWbl[x−2][y−1];

WWtl[x][y]=w[x][y]+Ftop_left*WWtl[x−1][y−1]+Ftop*WWtl[x][y−1]−Ftop_left*Ftop*WWtl[x−1][y−2], and inputs of said second pixel group (right) calculator means comprise the pixel excess black value b[x][y], the pixel excess white value w[x][y], right wedge excess black values WBtr[x][y−1], WBtr[x+1][y−1], WBtr[x+1][y−2], WBbr[x+1][y−1], WBbr[x+1][y], and WBbr[x+2][y−1] and right wedge excess white values WWtr[x][y−1], WWtr[x+1][y−1], WWtr[x+1][y−2], WWbr[x+1][y−1], WWbr[x+1][y], and WWbr[x+2][y−1] output from the second group memory means, wherein outputs of said second pixel group (right) calculator means comprise right wedge excess black values WBtr[x][y] and WBbr[x][y], right wedge excess white values WWtr[x][y] and WWbr[x][y] given by:

WBtr[x][y]=b[x][y]+Ftop*WBtr[x][y−1]+Ftop_right*WBtr[x+1][y−1]−Ftop*Ftop_right*WBtr[x+1][y−2];

WBbr[x][y]=b[x][y]+Ftop_right*WBbr[x+1][y−1]+Fright*WBbr[x+1][y]−Ftop_right*Fright*WBbr[x+2][y−1];

WWtr[x][y]=w[x][y]+Ftop*WWtr[x][y−1]+Ftop_right*WWtr[x+1][y−1]−Ftop*Ftop_right*WWtr[x+1][y−2];

WWbr[x][y]=w[x][y]+Ftop_right*WWbr[x+1][y−1]+Fright*WWbr[x+1][y]−Ftop_right*Fright*WWbr[x+2][y−1].

* * * * *

UNITED STATES PATENT AND TRADEMARK OFFICE
CERTIFICATE OF CORRECTION

PATENT NO. : 6,124,844
DATED : September 26, 2000
INVENTOR(S) : Peter William Mitchell Ilbery It is certified that error appears in the above-identified patent and that said Letters Patent is hereby corrected as shown below:

Title page,
Item [56], References Cited, FOREIGN PATENT DOCUMENTS,
      "03211967    9/1991    Japan
      06152966    5/1994    Japan" should read
--  03-211967    9/1991    Japan
      06-152966    5/1994    Japan --.

Drawings,
Sheet 2, FIG. 4, "Scan line" should read -- Scanline --.

Column 1,
Lines 12, 13 and 17, "digitised" should read -- digitized --;
Line 39, "Making" should read -- taking --; and
Line 64, "die" should read -- the --.

Column 2,
Line 1, "(ie." should read -- (i.e., --;
Line 5, "iii" should read -- in --; and
Line 29, "images have" should read -- images that have --.

Column 3,
Lines 28 and 30, "die" should read -- the --;
Line 31, "pixel," should read -- pixel; --; and
Lines 42 and 60, "a" should be deleted.

Column 4,
Lines 5 and 16, "a" should be deleted;
Line 22, "have" should read -- has --; and
Line 41, "an" (second occurrence) should read -- a --.

Column 5,
Line 15, "filed" should read -- field --;
Line 44, "values." should read -- value. --;
Line 55, "value" should read -- values --; and
Line 67, "scan line" should read -- scanline --.

Column 6,
Line 2, "includes" should read -- included --; and
Line 14, "below," should read -- below. --.

UNITED STATES PATENT AND TRADEMARK OFFICE
CERTIFICATE OF CORRECTION

PATENT NO.      : 6,124,844
DATED           : September 26, 2000
INVENTOR(S)     : Peter William Mitchell Ilbery It is certified that error appears in the above-identified patent and that said Letters Patent is hereby corrected as shown below:

Column 7,
Line 43, "image" should read -- image. --; and
Line 62, "45." should read -- 45, --.

Column 8,
Lines 2 and 19, "has" should read -- have --; and
Line 13, "immediate" should read -- immediately --.

Column 9,
Line 4, "tie" should read -- the --; and
Line 55, "value." should read -- value, --.

Column 10,
Line 32, "(ie." should read -- i.e., --.

Column 11,
Line 31, "is" should read -- are --;
Line 35, "repulsive for" should read -- repulsive force for --;
Line 36, "determined" should read -- determine --;
Line 42, "total white force," should read -- total white repulsive force, --; and
Line 43, "value," should read -- value. --.

Column 12,
Line 28, "anti-correlate(d" should read -- anti-correlated --; and
Lines 32 and 45, "is" should read -- are --.

Column 13,
Line 26, "summaries" should read -- summarises --.

Column 14,
Line 32, "$-FF_{left}*F_{top-}$" should read -- $-F_{Left}*F_{top-}$ --;
Line 54, "(eg." should read -- (e.g., --; and
Line 55, "(eg," should read -- (e.g., --.

Column 15,
Line 17, "grew" should read -- grey --;
Line 20, "influence," should read -- influence --; and
Line 47, "to" should be deleted.

UNITED STATES PATENT AND TRADEMARK OFFICE
CERTIFICATE OF CORRECTION

PATENT NO. : 6,124,844
DATED : September 26, 2000
INVENTOR(S) : Peter William Mitchell Ilbery It is certified that error appears in the above-identified patent and that said Letters Patent is hereby corrected as shown below:

Column 17,
Line 16, "(eg." should read -- e.g., --;
Line 55, "accordance" should read -- accordance with --.

Column 18,
Line 48, "are" should read -- is --.

Column 19,
Line 20, "the" (first occurrence) should be deleted.

Column 20,
Line 16, "244.000230," should read -- 224.000230, --;
Line 24, "138.993754," should read -- 138.993745, --;
Appendix 2, "intg;" should read -- int g; --; and
Appendix 2, "static double fx = 3.018;
           static double fy = 3.018; should read
        -- static double fx = 3.0/8;
           static double fy = 3.0/8; --.

Column 21,
Appendix 2, "double xbur_plane;" should read -- double xblr_plane; --; and
"xbln = 0;   should read -- xb_in = 0;
 xwln    "                 xw_in = 0; -- and
"xw = fx xwll_plane [y] [x-1];" should read -- xw = fx*wll_plane [y] [x-1]; --.

Column 22,
Appendix 2, "xblnt = xb;    should read -- xb_int = xb;
            xwlnt = xw;"                xw_int = xw; -- and "force_diff <<
force_plus_th)" should read -- force_diff <= force_plus_th) --; and "if (from_val >
dither_val;" should read -- if (from_val > dither_val) --.

Column 23,
Appendix 2, "xwlr = -e_out" should read -- xwlr = -e_out; --.

Column 24,
Appendix 2, "xwlr_plane [y] [x] = xwlr:" should read -- xwlr_plane [y] [x] = xwlr; --
and "free (xwll_plane [y])," should read -- free(xwll_plane[y];) --.

UNITED STATES PATENT AND TRADEMARK OFFICE
CERTIFICATE OF CORRECTION

PATENT NO. : 6,124,844
DATED : September 26, 2000
INVENTOR(S) : Peter William Mitchell Ilbery It is certified that error appears in the above-identified patent and that said Letters Patent is hereby corrected as shown below:

Column 27,
Line 5, "claim 1," should read -- claim 9, --; and
Line 10, "(i-j,1)" should read -- (i-1,1), --.

Column 28,
Line 38, "plurality pixels" should read -- plurality of pixels --.

Column 29,
Line 23, "(eg." should read -- e.g., --.

Column 30,
Line 13, "in 34," should read -- in claim 34, --; and
Line 48, "under repulsive measure." should read -- under result repulsive measure. --.

Column 32,
Line 52, "claim 49" should read -- claim 49, --; and
Line 53, "comprises" should read -- comprise --.

Column 34,
Line 3, "[y-2], and" should read -- [y-2]; and --.

Signed and Sealed this

Twenty-fourth Day of June, 2003

JAMES E. ROGAN
*Director of the United States Patent and Trademark Office*